(12) United States Patent
Nakahashi et al.

(10) Patent No.: US 8,259,421 B2
(45) Date of Patent: Sep. 4, 2012

(54) ABNORMAL CURRENT PREVENTIVE CIRCUIT OF DC-DC CONVERTER

(75) Inventors: Yasunori Nakahashi, Tokyo (JP); Masayuki Yamadaya, Matsumoto (JP); Satoshi Yamane, Saitama (JP)

(73) Assignee: Fuji Electric Co., Ltd. (JP)

( * ) Notice: Subject to any disclaimer, the term of this patent is extended or adjusted under 35 U.S.C. 154(b) by 374 days.

(21) Appl. No.: 12/538,640

(22) Filed: Aug. 10, 2009

(65) Prior Publication Data
US 2010/0067152 A1   Mar. 18, 2010

(30) Foreign Application Priority Data
Aug. 18, 2008 (JP) .................. 2008-209788

(51) Int. Cl.
*H02H 7/00* (2006.01)

(52) U.S. Cl. ........ 361/18; 361/93.1; 363/50; 363/56.03; 323/276

(58) Field of Classification Search ............ 361/18, 361/93.1; 363/50, 56.03, 56.07, 56.1; 323/276, 323/282
See application file for complete search history.

(56) References Cited

U.S. PATENT DOCUMENTS

| | | | |
|---|---|---|---|
| 7,403,365 B2 * | 7/2008 | Sase et al. ............... | 361/93.1 |
| 7,420,356 B2 | 9/2008 | Hojo | |
| 7,738,227 B2 * | 6/2010 | Fang et al. ............... | 361/93.1 |
| 7,923,978 B2 * | 4/2011 | Kawashima et al. ...... | 323/277 |
| 2008/0024098 A1 | 1/2008 | Hojo | |
| 2009/0001951 A1 | 1/2009 | Hojo | |

FOREIGN PATENT DOCUMENTS

JP   2005-237099 A   9/2005

* cited by examiner

*Primary Examiner* — Patrick Salce
(74) *Attorney, Agent, or Firm* — Schwegman, Lundberg & Woessner, P.A.

(57) ABSTRACT

The voltage of a detection resistor connected to the drain of a low-side switching device is normally a negative voltage, but a positive voltage appears when a countercurrent occurs in an abnormal state. A current comparator monitors the voltage of the detection resistor, transmits high output to an AND circuit whole the voltage of the detection resistor is a negative voltage to maintain the output voltage of the current comparator in a low state when an output signal of a driver can be transmitted to the low-side switching device, and allows the output voltage of the current comparator in a low state when the voltage of the detection resistor becomes a positive voltage, thereby forcibly turning off the low-side switching device.

8 Claims, 20 Drawing Sheets

ABNORMAL CURRENT PREVENTIVE CIRCUIT OF DC-DC CONVERTER

RELATED APPLICATION

This application claims the benefit of priority, under 35 U.S.C. Section 119, to Japanese Patent Application Serial No. 2008-209788, filed on Aug. 18, 2008, which is incorporated herein by reference in its entirety.

BACKGROUND OF THE INVENTION

1. Field of the Invention

The present invention relates to an abnormal current preventive circuit of a DC-DC converter for determining the presence/absence of an abnormal current such as a countercurrent from an energy-accumulated inductor, an overcurrent of an inductor, etc., and preventing the abnormal current when it is detected.

2. Description of the Related Art

FIG. 1 shows a configuration of a synchronous rectification buck type DC-DC converter which determines the presence/absence of a countercurrent as an abnormal current, and includes a conventional countercurrent preventive circuit for preventing the countercurrent when it is detected. In FIG. 1, the configuration includes: an input power source terminal (VIN terminal) 101; a feedback voltage input terminal (FB-IN terminal) 102 to which a feedback voltage detected after dividing an output voltage (OUTPUT) supplied to a load not shown in FIG. 1 by a resistor R3 (117) and a resistor R2 (118) is input; an output terminal (OUT terminal) 103 of a circuit for controlling energy accumulation/release (hereinafter energy accumulation is referred to as 'charge', and energy release as 'discharge'); a ground terminal (GND terminal) 104; an oscillator (OSC) 105 for outputting a clock signal; a ramp generator 106 for generating a ramp signal Vramp by a trigger of the output of the oscillator (OSC) 105; an error amp 108 for comparing a feedback voltage with a reference voltage VREF1 (107) and outputting an error signal Verror; a PWM (pulse-width modulation) comp 109 for comparing an output Verror of the error amp 108 with the output Vramp of the ramp generator 106, converting a control signal into a pulse width and outputting a conversion result; a driver 110 for driving a high-side switching device (Q31) 113 for control of a charging period of an inductor L1 (115), a low-side switching device (Q32) 114 for controlling the charging period of the inductor L1 (115), and a switching device (Q33) 119; a voltage comparator 111 for comparing a voltage of a detection resistor 112 with GRD potential and determining the presence/absence of a countercurrent; a resistor 112 for detecting a countercurrent of an inductance current when the low-side switching devices 114 and 119 are in the ON states; a smoothing capacitor (Cout) 116 for obtaining an output voltage; and an AND circuit 120 for placing the low-side switching devices 114 and 119 in the OFF states when a countercurrent flows from the inductor L1 (115). The high-side switching device (Q31) 113 is configured by a Pch MOSFET, and the low-side switching device (Q32) 114 and the switching device (Q33) 119 are configured by an Nch MOSFET. A Pch MOSFET is short for a P-channel metal oxide semiconductor field effect transistor, and an Nch MOSFET is short for an N-channel metal oxide semiconductor field effect transistor.

In FIG. 1, the output voltage OUTPUT of the DC-DC converter is divided by the resistor R3 (117) and the resistor R2 (118), and applied to the feedback voltage input terminal 102. The feedback voltage and the reference voltage VREF1 (107) are compared by the error amp 108, and transmitted to the PWM comp 109 as an error signal Verror. The PWM comp 109 compares the error signal Verror with the output Vramp of the ramp generator 106, and transmits an output signal that places the high-side switching devices 113 in the ON states to the driver 110 when Verror>Vramp and places the low-side switching devices 114 and 119 in the ON states to the driver 110 when Verror<Vramp. The driver 110 drives a switching device according to the output signal of the PWM comp 109, but basically turns ON/OFF (inversely) the high-side switching devices 113 and the low-side switching devices 114 and 119 complementarily, and does not turn them ON simultaneously (for setting a dead time), thereby realizing a non-overlap function.

When the high-side switching device 113 is placed in the ON states, the inductor L1 (115) is charged by the power source 101. When the low-side switching devices 114 and 119 are placed in the ON states, the inductor L1 (115) is discharged through the load and the low-side switching devices 114 and 119. In the charge/discharge cycle, when the output voltage OUTPUT is low, the output voltage Verror of the error amp 108 becomes high. As a result, the ON duty ratio of the high-side switching device 113 becomes high, and the ON period of the low-side switching devices 114 and 119 becomes short, thereby enhancing the output voltage OUTPUT. On the other hand, when the output voltage OUTPUT is high, an inverse result occurs, the ON duty ratio of the high-side switching device 113 becomes low, and the ON period of the low-side switching devices 114 and 119 becomes long, thereby reducing the output voltage OUTPUT. By repeating the cycle, the control circuit functions to constantly keep the voltage of the feedback voltage input terminal 102 equal to the reference voltage 107, thereby controlling the output voltage OUTPUT to be expressed by the following equation (1).

$$V_{out} = VREF1 * (1 + R3/R2) \quad (1)$$

(where VREF1 indicates the voltage of the reference voltage 107)

In FIG. 1, when the ON period of the low-side switching devices 114 and 119 is long, and the energy of the inductor 115 becomes exhausted, the inductor L1 (115) is charged from the smoothing capacitor 116 through the low-side switching devices 114 and 119. Thus, the inductance current of the inductor 115 inversely flows as a countercurrent. Although the voltage of the detection resistor 112 is normally a negative voltage, it is a positive voltage when a countercurrent occurs. When the countercurrent flows, the output voltage of the voltage across the smoothing capacitor 116 suddenly falls because the source of the countercurrent is the electric charge accumulated in the smoothing capacitor 116. Passing the electric charge accumulated in the smoothing capacitor 116 inversely in the inductor 115 refers to discarding the energy accumulated in the smoothing capacitor 116, that is, a loss of electric power of the DC-DC converter. Therefore, the low-side switching devices 114 and 119 that receive the countercurrent are to be turned OFF to prevent the countercurrent. It is performed by the voltage comparator 111 and the AND circuit 120. The voltage comparator 111 compares the voltage of the detection resistor 112 with the GND level, transmits the high output to the AND circuit 120 while the voltage of the detection resistor 112 is negative so that the output signal of the driver 110 can be transmitted to the low-side switching devices 114 and 119. When the voltage of the detection resistor 112 becomes a positive voltage, the output voltage of the voltage comparator 111 becomes low, thereby forcibly turning OFF the low-side switching devices 114 and 119.

It is expected that an ideal countercurrent detecting operation by the voltage comparator 111 can be performed when there is no delay time of the voltage comparator. However, the delay time of the voltage comparator cannot be avoided, and the ideal operation cannot be expected. According to the simulation of the inventor, the delay time of the voltage comparator with the normal configuration is 200~300 ns. The delay time of 200~300 ns refers to the delay time of the timing with which the low-side switching devices 114 and 119 is turned OFF, and the countercurrent flows through the inductor 115 during the time. Since the recent tendency of DC-DC converters is the clock frequency of 1 MHz or more, that is, the switching period of 1000 ns or less, the influence has become serious. That is, the fluctuation of the output voltage of the DC-DC converters has become large, thereby degrading operation efficiency.

In the description above, the countercurrent from an energy-accumulated inductor is described. There is a similar problem with the overcurrent of an inductor where, for example, a voltage comparator shown in FIG. 1 is applied as is to a boost type DC-DC converter.

FIG. 2 shows the configuration of a boost type DC-DC converter for including a conventional overcurrent preventive circuit for determining the presence/absence of an overcurrent as an abnormal current to prevent the overcurrent when it is detected. In FIG. 2, the configuration includes: an input power source terminal (VIN terminal) 201; a feedback voltage input terminal (FB-IN terminal) 202 to which a feedback voltage detected after dividing an output voltage (OUTPUT) supplied to a load not shown in FIG. 2 by a resistor R3 (217) and a resistor R2 (218) is input; an output terminal (OUT terminal) 203 of a circuit for controlling energy accumulation/release (hereinafter energy accumulation is referred to as 'charge', and energy release as 'discharge'); a ground terminal (GND terminal) 204; an oscillator (OSC) 205 for outputting a clock signal; a ramp generator 206 for generating a ramp signal Vramp by a trigger of the output of the oscillator (OSC) 205; an error amp 208 for comparing a feedback voltage with a reference voltage VREF1 (207) and outputting an error signal Verror; a PWM (pulse-width modulation) comp 209 for comparing an output Verror of the error amp 208 with the output Vramp of the ramp generator 206, converting a control signal into a pulse width and outputting a conversion result; a latch device 210 set according to the overcurrent detection signal of a voltage comparator 211 for turning OFF a switching device (Q32) 214 and a switching device (Q33) 219 by transmitting a signal to an AND circuit 220; the voltage comparator 211 for comparing the voltage of a detection resistor (R1) 212 with a reference voltage VREF2 (221) to determine the presence/absence of an overcurrent; a resistor 212 for detecting an inductance current while the switching devices 214 and 219 are placed in the ON states; a diode (D1) 213 for preventing the boosted output voltage (OUTPUT) from being a countercurrent to the power source 201; a smoothing capacitor (Cout) 216 for obtaining an output voltage (OUTPUT); and the AND circuit 220 for driving the switching devices 214 and 219 for controlling the charging period of the inductor L1 (215).

In FIG. 2, when the switching devices 214 and 219 are placed in the ON states, a charge current passes from the power source 201 to the inductor 215, and the energy is accumulated. When the switching devices 214 and 219 are placed in the OFF states, the energy accumulated in the inductor 215 is supplied to the smoothing capacitor 216 on the output side and a load through the diode 213. The output voltage (OUTPUT) of the DC-DC converter is divided by the resistor R3 (217) and the resistor R2 (218) and applied to the feedback voltage terminal 202, and the feedback voltage and the reference voltage VREF1 (207) is compared by the error amp 208, and transmitted as an error signal Verror to the PWM comp 209. The PWM comp 209 compares the error signal Verror with Vramp as the output of the ramp generator 206. If Verror>Vramp, the switching devices 214 and 219 are placed in the ON states. If Verror<Vramp, the switching devices 214 and 219, an output signal for placing the switching devices 214 and 219 in the OFF states is transmitted to the AND circuit 220.

When the output voltage (OUTPUT) is low, the output voltage Verror becomes high, the ON duty ratio of the switching devices 214 and 219 becomes high, and the OFF period of the switching devices 214 and 219 becomes short, thereby enhancing the output voltage (in the normal continuous mode of the boost type DC-DC converter, the output voltage (OUTPUT)=VIN*(Ton+Toff) where Ton and Toff respectively indicate the ON period and the OFF period of the switching devices 214 and 219). On the other hand, when the output voltage (OUTPUT) is high, the inverse results are obtained, that is, the ON duty ratio becomes low, and the OFF period of the switching devices 214 and 219 becomes long, thereby lowering the output voltage. By repeating the cycle, the control circuit functions to constantly keep the voltage of the feedback voltage input terminal 202 equal to the reference voltage VREF1 (207), and the output voltage is controlled as a value expressed by the equation (1) above.

In FIG. 2, if the ON period of the switching devices 214 and 219 is long, the current flowing through the inductor 215 increases with the lapse of time, and the drain current of the switching devices 214 and 219 exceeds the maximum rating, then there is a strong possibility that the switching device 214 is destroyed. Normally, to restrict the drain current before it reaches the maximum rating, the switching device 219 that is similar to and has 1/N gate width of the switching device 214 is connected in parallel, and the detection resistor (R1) 212 is interposed between the source and the GND (ground) to monitor the drain current of the switching device 214 by the voltage comparator 211. The switching device 219 is used because it is necessary to reduce the resistance value of the detection resistor R1 (212) down to 1Ω or less to face the large drain current when the detection resistor 212 is connected between the source of the switching device 214 and the GND. The required resistance cannot be manufactured by an IC.

The voltage of the detection resistor 212 is proportional to the inductance current of the switching devices 214 and 219 in the ON period. If the voltage comparator 211 compares the voltage with the reference voltage VREF2 (221), and the voltage of the resistor exceeds the reference voltage VREF2 (221), then the presence of an overcurrent is determined, the output (CP OUT) of the voltage comparator 211 is inverted into a low state, and the output D0 of the latch device 210 is placed in the low state. The output D0 of the latch device 210 is placed in the high state in advance according to a reset signal. Then, since the output D0 is connected to another input terminal of the AND circuit 20, the switching devices 214 and 219 are turned off to prevent the drain current (overcurrent). The operation is normally performed in every cycle of the clock signal, and the latch device 210 is reset at every reset signal.

Thus, although the overcurrent is avoided as described above, the overcurrent detecting operation of the voltage comparator 211 shown in FIG. 2 can be ideally performed when there is no delay time of the voltage comparator as described above with reference to the voltage comparator 111 in detecting a countercurrent with reference to FIG. 1. However, the delay time of the voltage comparator cannot be actually avoided, and the ideal operation cannot be expected. Therefore, the switching device 214 can be destroyed with a high probability. Accordingly, it is necessary to take countermeasures to increase a margin by reducing the set value of the overcurrent against the delay time. One of the countermeasures to increase a margin is to make a larger switching device 214, and another is to increase the bias current of the voltage comparator to shorten the delay time.

Thus, the presence/absence of an abnormal current such as a countercurrent from an inductor, an overcurrent of an inductor, etc. is determined using a voltage comparator. However, in the patent document 1 described below proposes a current direction detection circuit for preventing a countercurrent as an abnormal current, and operates the current direction detection circuit not by a voltage, but by a current mode (the signal for the operation is not a voltage signal but a current signal), thereby succeeding in operating it as a smaller circuit in a shorter delay time.

The delay time with the above-mentioned conventional voltage comparator fluctuates depending on the device characteristic normally caused by the manufacturing process of an IC, it is necessary to set a large margin, thereby causing the problem that the sizes of the switching devices shown in FIGS. 1 and 2 unnecessarily increase and that the cost also increases. In addition, when the bias current is increased to shorten the delay time in the conventional voltage comparator, the power consumption increases and the operation efficiency is degraded.

With the current direction detection circuit having the countercurrent preventive function disclosed by the patent document 1, there is the problem that the characteristic cannot be stable because the influence of the device fluctuation on the characteristic is large.

[Patent Document 1] Japanese Laid-open Patent Publication No. 2005-237099

SUMMARY OF THE INVENTION

The present invention aims at providing an abnormal current preventive circuit of a DC-DC converter having a smaller circuit with a shorter delay, and a less influence in device variance.

To attain the objective above, according to an aspect of the present invention in a synchronous rectification buck type DC-DC converter, a first Nch MOSFET is provided at a low side, and a second Nch MOSFET similar to the first Nch MOSFET is connected in parallel to the first Nch MOSFET to detect the current of the first Nch MOSFET. A detection resistor is connected between the source of the second Nch MOSFET and the ground, a voltage across the detection resistor is input to a current comparator, and the current comparator determines an abnormal current by converting the input voltage into a current, and comparing the current with a reference current, thereby determining the abnormal current.

According to another aspect of the present invention in a boost type DC-DC converter, a first Nch MOSFET as a first switching device is connected in parallel to a second Nch MOSFET similar to the first Nch MOSFET, a detection resistor is connected between the source of the second Nch MOSFET and the ground, the voltage the across the detection resistor is input to the current comparator, the current comparator converts the input voltage into a current, compares the current with the reference current, determines the presence/absence of an abnormal current, and turns off the first and second Nch MOSFETs when the abnormal current is detected.

According to a further aspect of the present invention in a buck type DC-DC converter, a first Pch MOSFET as a first switching device is connected parallel to a second Pch MOSFET similar to the first Pch MOSFET, a detection resistor is connected between the source of the second Pch MOSFET and a power source, and the voltage across the of the detection resistor is input to the current comparator. The current comparator converts the input voltage into a current, compares the current with the reference current, and determines the presence/absence of an abnormal current. If the presence of an abnormal current is determined, the first and the second Pch MOSFETs are turned off.

Thus, the present invention prevents an abnormal current such as an overcurrent, a countercurrent, etc. by a current comparator. Therefore, for example, when it is used for preventing an overcurrent, an abnormal current flowing through a switching device is quickly restricted to avoid the destruction of the switching device, enhance the area efficiency in manufacturing a device by a semiconductor because it is not necessary to keep a wasteful margin for a switching device, and reduce the cost.

In addition, according to the present invention, a countercurrent of an inductance current is substantially cut off when it is applied to prevent a countercurrent, thereby realizing reduced fluctuation in output voltage, a stable operation, an improved efficiency, and lower power consumption.

DESCRIPTION OF THE PREFERRED EMBODIMENT

The best modes for embodying the present invention are described below in detail with reference to the attached drawings.

Embodiment 1

Figure 3:
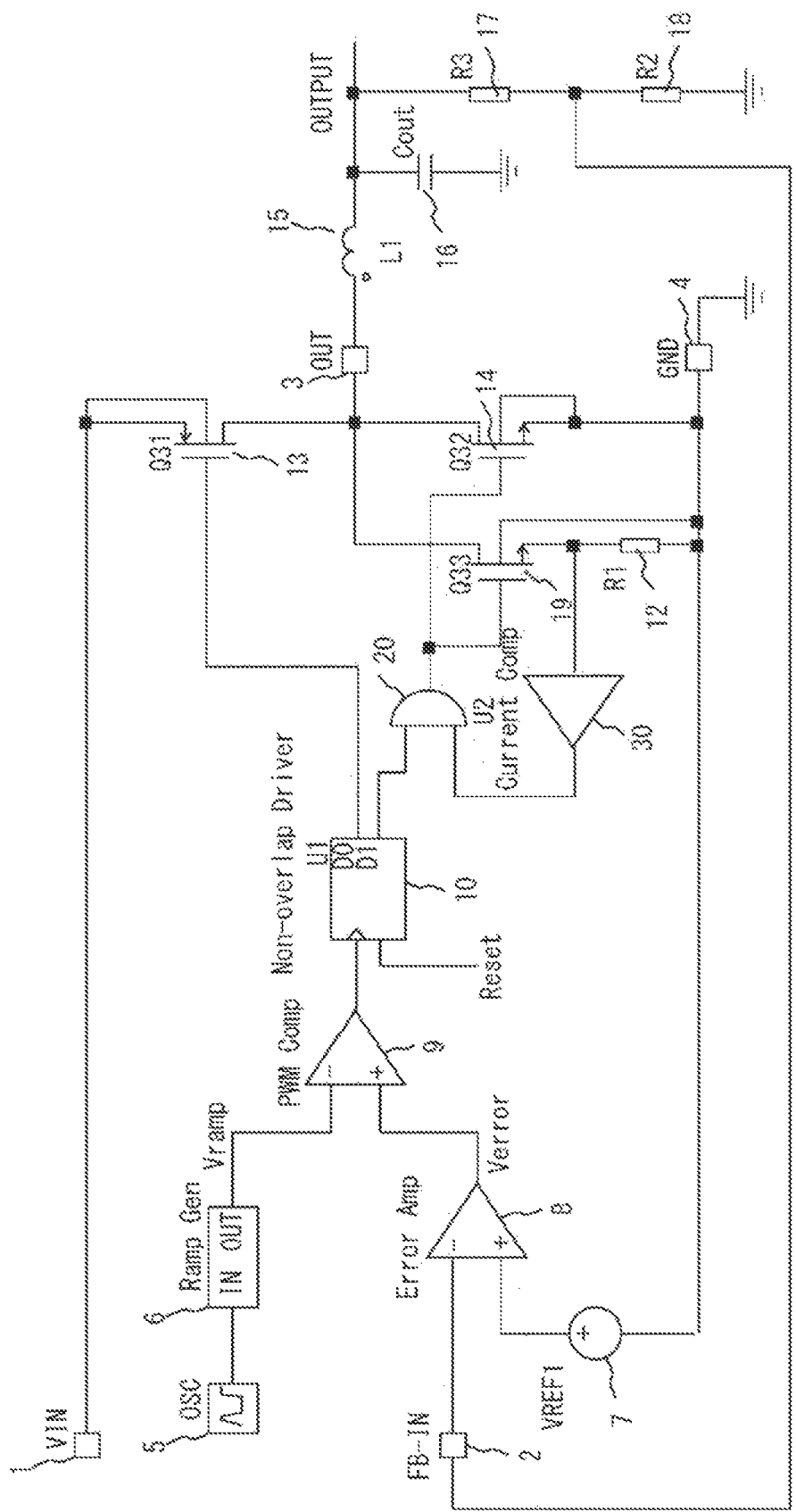
FIG. 3 shows a configuration of the abnormal current preventive circuit and the synchronous rectification buck type DC-DC converter including the circuit according to an embodiment of the present invention.

FIG. 3 shows a configuration of the abnormal current preventive circuit and the synchronous rectification buck type DC-DC converter including the circuit according to an embodiment of the present invention. In FIG. 3, the configuration includes: an input power source terminal (VIN terminal) 1; a feedback voltage input terminal (FB-IN terminal) 2 to which a feedback voltage detected after dividing an output voltage (OUTPUT) supplied to a load not shown in FIG. 3 by a resistor R3 (17) and a resistor R2 (18) is input; an output terminal (OUT terminal) 3 of a circuit for controlling energy accumulation/release (hereinafter energy accumulation is referred to as 'charge', and energy release as 'discharge'); a ground terminal (GND terminal) 4; an oscillator (OSC) 5 for outputting a clock signal; a ramp generator 6 for generating a ramp signal Vramp by a trigger of the output of the oscillator (OSC) 5; an error amp 8 for comparing a feedback voltage with a reference voltage VREF1 (7) and outputting an error signal Verror; a PWM (pulse-width modulation) comp 9 for comparing an output Verror of the error amp 8 with the output Vramp of the ramp generator 6, converting a control signal into a pulse width and outputting a conversion result; a driver 10 for driving a high-side switching device (Q31) 13 for control of a charging period of an inductor L1 (15), a low-side switching device (Q32) 14 for controlling the charging period of the inductor L1 (15), and a switching device (Q33) 19; a resistor 12 for detecting a countercurrent of an inductance current when the low-side switching devices 14 and 19 are in the ON states; a smoothing capacitor (Cout) 16 for obtaining an output voltage; an AND circuit 20 for placing the low-side switching devices 14 and 19 in the OFF states when a countercurrent flows from the inductor L1 (15); and a current comparator 30 for monitoring the voltage of the detection resistor 12 and determines the presence/absence of a countercurrent.

In FIG. 3, the output voltage OUTPUT of the DC-DC converter is divided by the resistor R3 (17) and the resistor R2 (18), and applied to the feedback voltage input terminal 2. The feedback voltage and the reference voltage VREF1 (7) are compared by the error amp 8, and transmitted to the PWM comp 9 as an error signal Verror. The PWM comp 9 compares the error signal Verror with the output Vramp of the ramp generator 6, and transmits an output signal that places the high-side switching devices 13 in the ON states to the driver 10 when Verror>Vramp and places the low-side switching devices 14 and 19 in the ON states to the driver 10 when Verror<Vramp. The driver 10 drives a switching device according to the output signal of the PWM comp 9, but basically turns ON/OFF (inversely) the high-side switching devices 13 and the low-side switching devices 14 and 19 complementarily, and does not turn them ON simultaneously (for setting a dead time), thereby realizing a non-overlap function.

When the high-side switching device 13 is placed in the ON states, the inductor L1 (15) is charged by the power source 1. When the low-side switching devices 14 and 19 are placed in the ON states, the inductor L1 (15) is discharged through the load and the low-side switching devices 14 and 19. In the charge/discharge cycle, when the output voltage OUTPUT is low, the output voltage Verror of the error amp 8 becomes high. As a result, the ON duty ratio of the high-side switching device 13 becomes high, and the ON period of the low-side switching devices 14 and 19 becomes short, thereby enhancing the output voltage OUTPUT. On the other hand, when the output voltage OUTPUT is high, an inverse result occurs, the ON duty ratio of the high-side switching device 13 becomes low, and the ON period of the low-side switching devices 14 and 19 becomes long, thereby reducing the output voltage OUTPUT. By repeating the cycle, the control circuit functions to constantly keep the voltage of the feedback voltage input terminal 2 equal to the reference voltage 7, thereby controlling the output voltage OUTPUT to be expressed by the equation (1) above.

In FIG. 3, when the ON period of the low-side switching devices 14 and 19 is long, and the energy of the inductor 15 becomes exhausted, the inductor L1 (15) is charged from the smoothing capacitor 16 through the low-side switching devices 14 and 19. Thus, the inductance current of the inductor 15 inversely flows as a countercurrent. Although the voltage of the detection resistor 12 is normally a negative voltage, it is a positive voltage when a countercurrent occurs. When the countercurrent flows, the output voltage of the voltage across the smoothing capacitor 16 suddenly falls because the source of the countercurrent is the electric charge accumulated in the smoothing capacitor 16. Passing the electric charge accumulated in the smoothing capacitor 16 inversely in the inductor 15 refers to discarding the energy accumulated in the smoothing capacitor 16, that is, a loss of electric power of the DC-DC converter. Therefore, the low-side switching devices 14 and 19 that receive the countercurrent are to be turned OFF to prevent the countercurrent. It is performed by the current comparator 30 and the AND circuit 20. The current comparator 30 monitors the voltage of the detection resistor 12 with the GND level, transmits the high output to the AND circuit 20 while the voltage of the detection resistor 12 is negative so that the output signal of the driver 10 can be transmitted to the low-side switching devices 14 and 19. When the voltage of the detection resistor 12 becomes a positive voltage, the output voltage of the current comparator 30 becomes low, thereby forcibly turning OFF the low-side switching devices 14 and 19.

Figure 4:
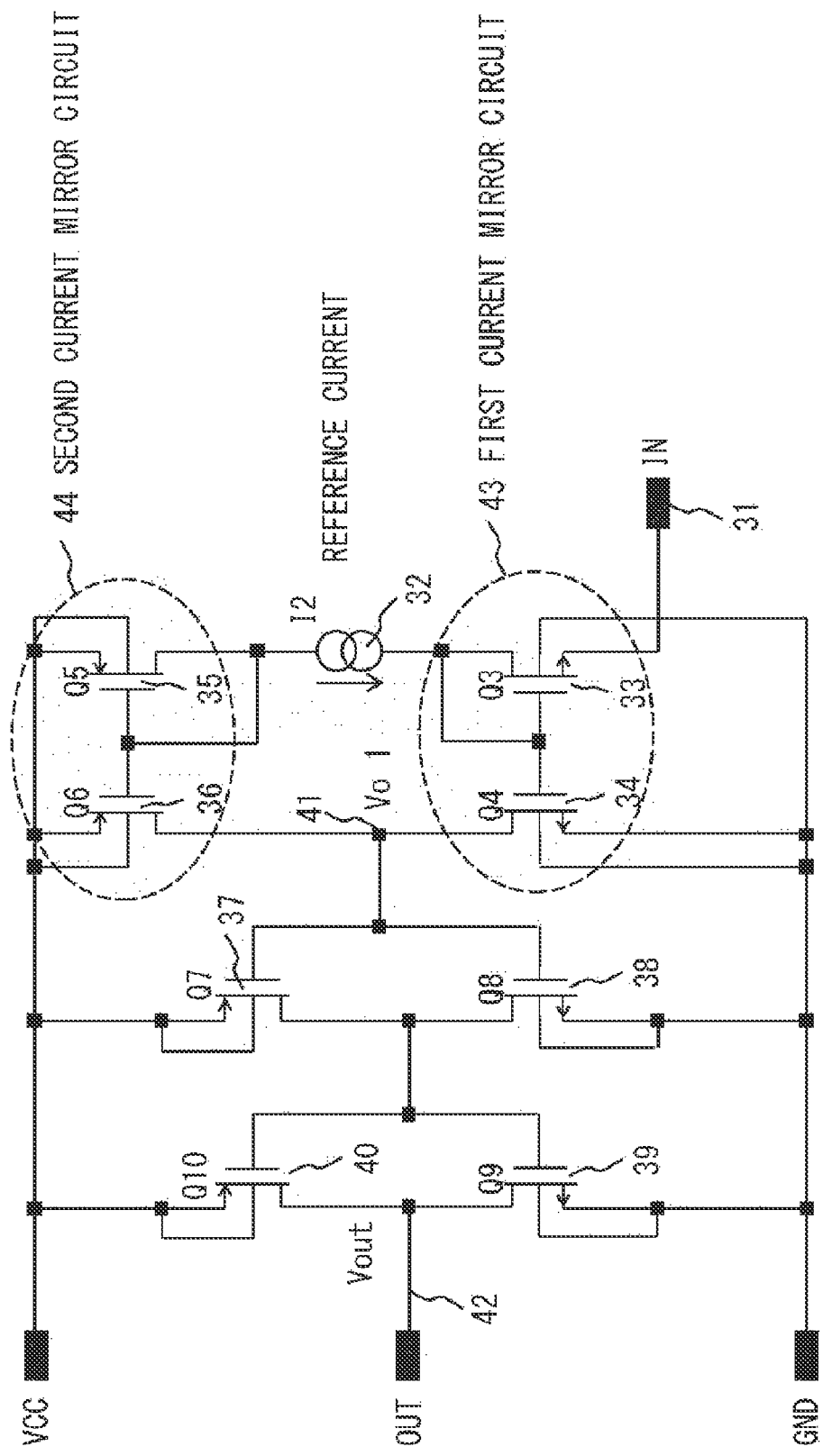
FIG. 4 shows a circuit illustrating a practical example of the current comparator shown in FIG. 3.
Figure 5:
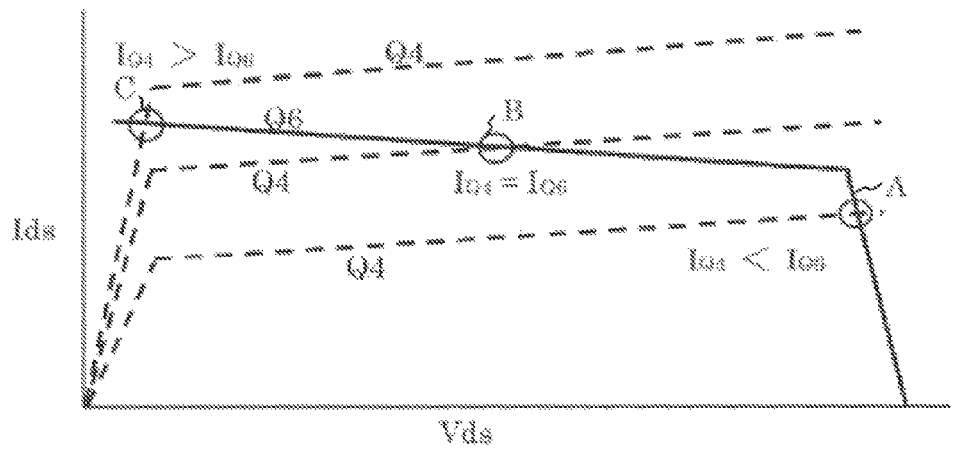
FIG. 5 is an explanatory view of a current comparing operation of the current comparator shown in FIG. 4.

FIG. 4 shows a circuit illustrating a practical example of the current comparator 30 shown in FIG. 3. FIG. 5 is an explanatory view of a current comparing operation of the current comparator 30 shown in FIG. 4. An IN terminal 31 shown in FIG. 4 is connected to a connection point between the detection resistor R1 (12) and the switching device 19 shown in FIG. 3. An OUT terminal 42 is connected to the AND circuit 20, a VCC terminal is connected to the power source terminal 1, and the GND terminal is connected to the GND 4. The current value of a constant current source 12 (32) shown in FIG. 4 is set as a reference current value for determination that an abnormal current (countercurrent in this case) has flowed. Assume 10 µA as a typical value. If the potential of the IN terminal 31 refers to a GND level, the current of the constant current source I2 (32) is mirrored as is by a first current mirror circuit 43 configured by an Nch MOSFET Q3 (33) and an Nch MOSFET Q4 (34), and a current equivalent to the current of the constant current source I2 (32) flows through the Nch MOSFET Q4 (34). In addition, the current of the constant current source I2 (32) is also mirrored by a second current mirror circuit 44 configured by a Pch MOSFET Q5 (35) and a Pch MOSFET Q6 (36), and a current equivalent to the current of a constant current source I2 (33) flows through the Pch MOSFET Q6 (36). This process corresponds to the point B in FIG. 5. FIG. 5 shows the relationship between the drain current Ids of the Nch MOSFET Q4 (34) and the Pch MOSFET Q6 (36) and the source-drain voltage Vds. The Ids of the Nch MOSFET Q4 (34) is indicated in broken lines and the Ids of the Pch MOSFET Q6 (36) is indicated in solid lines. Since the drain current Ids of the Nch MOSFET Q4 (34) is equal to that of the Pch MOSFET Q6 (36), drain voltage Vo 1 (41) of the Nch MOSFET Q4 (34) and the Pch MOSFET Q6 (36) falls at the point B in FIG. 5. The potential of the IN terminal 31 at the GND level indicates that no current flows through the detection resistor R1 (12), and the current flowing through the low-side switching devices (Q32) 14 and (Q33) 19 is just switched from a normal current to a countercurrent (to be strict, it is the point immediately before a current of 10 µA flowing through the switching device (Q33) 19 is switched into a countercurrent).

Next, in FIG. 3, while the low-side switching device (Q32) 14 and the switching device (Q33) 19 are placed in the ON states and no countercurrent flows through them, the voltage at the connection point between the detection resistor R1 (12) and the switching device 19 is in the negative voltage status and is lower than the GND potential. Therefore, the source potential of the Nch MOSFET Q3 (33) refers to a negative voltage. On the other hand, since the source potential of the Nch MOSFET Q4 (34) is the GND potential, the source-gate voltage (VGS) of the Nch MOSFET Q4 (34) is smaller than the source-gate voltage (VGS) of the Nch MOSFET Q3 (33) (source-gate voltage required to flow the current of the constant current source I2 (32)), the current of the Nch MOSFET Q4 (34) is smaller than the current of the constant current source I2 (32), that is, the drain current of the Pch MOSFET Q6 (36). This process refers to the state at the point A in FIG. 5, the drain voltage Vo 1 (41) is in the high state, and the voltage of the output terminal (OUT) 42 of the current comparator 30 in FIG. 3 is also in the high state. Therefore, in FIG. 3, the low-side switching device (Q32) 14 and the switching device (Q33) 19 are held in the ON states. The output terminal (OUT) 42 of the current comparator 30 is output from the 2-stage inverter configured by the first inverter including a Pch MOSFET Q7 (37) and an Nch MOSFET Q8 (38) and the second inverter including a Pch MOSFET Q10 (40) and an Nch MOSFET Q9 (39). In the practical example, a 2-stage inverter is illustrated, but the number of stages is not limited to two, but can be appropriately determined.

In FIG. 3, if a countercurrent as an abnormal current flows through the low-side switching device (Q32) 14 when the low-side switching device (Q32) 14 and the switching device (Q33) 19 are placed in the ON states, then the voltage of the IN terminal 31 shown in FIG. 4 becomes higher than the GND potential. Thus, contrary to the process above, the source-gate voltage (VGS) of the Nch MOSFET Q4 (34) becomes larger than the source-gate voltage (VGS) of the Nch MOSFET Q3 (33) (source-gate voltage required to flow the current of the constant current source I2 (32)). Therefore, the current of the Nch MOSFET Q4 (34) becomes larger than the current of the constant current source I2 (32), that is, the drain current of the Pch MOSFET Q6 (36). This process refers to the state at the point C in FIG. 5, the drain voltage Vo 1 (41) is in the low state, the voltage of the output terminal (OUT) 42 of the current comparator 30 is also in the low state, a low voltage is transmitted to the AND circuit 20 in FIG. 3, and the low-side switching device (Q32) 14 and the switching device (Q33) 19 are placed in the OFF states. Thus, the operation efficiency can be improved by preventing an abnormal current (countercurrent), and a stable operation can be realized with reduced fluctuation in output voltage.

Figure 1:
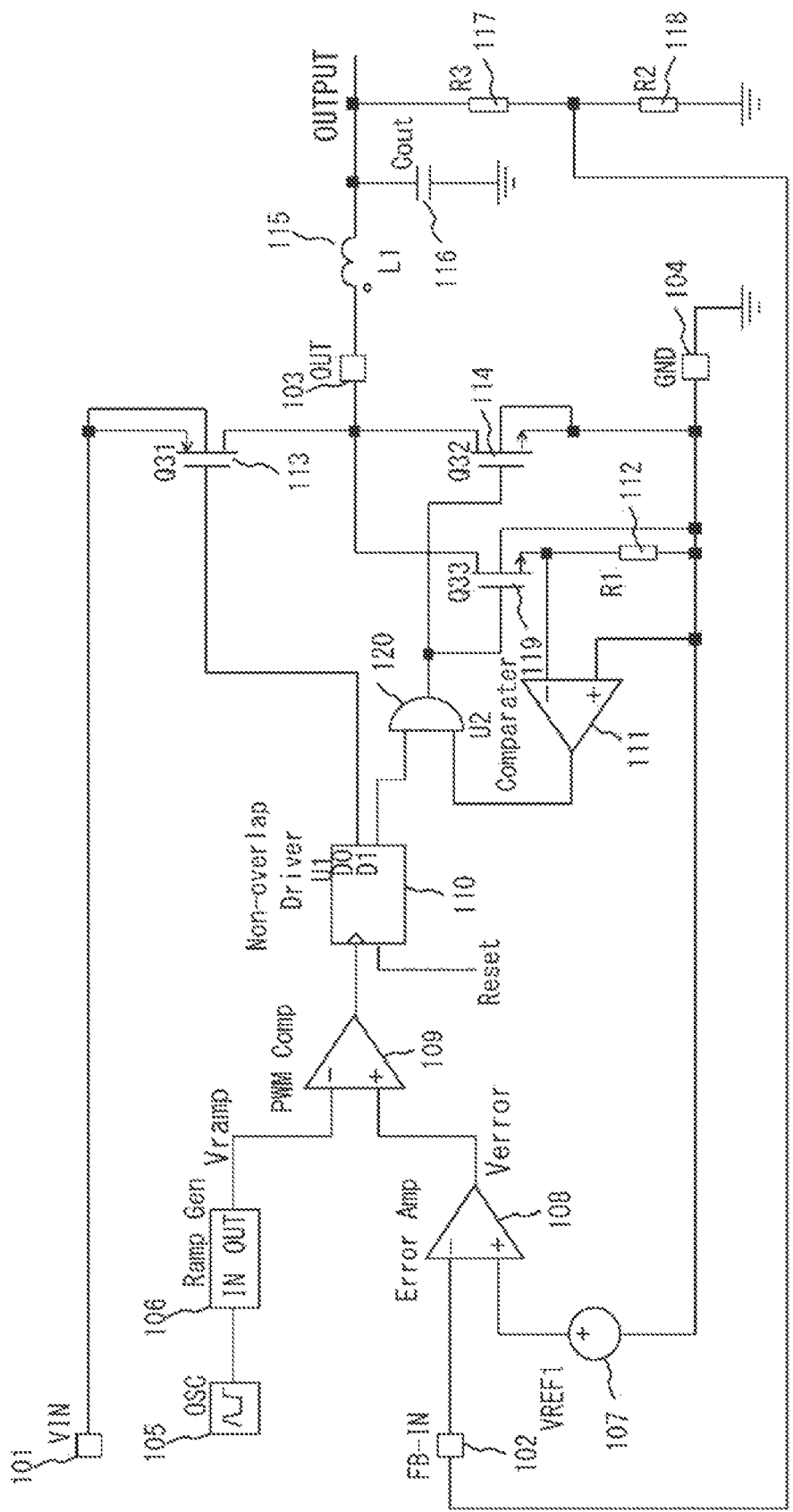
FIG. 1 shows a configuration of the synchronous rectification buck type DC-DC converter including the conventional countercurrent preventive circuit.
Figure 2:
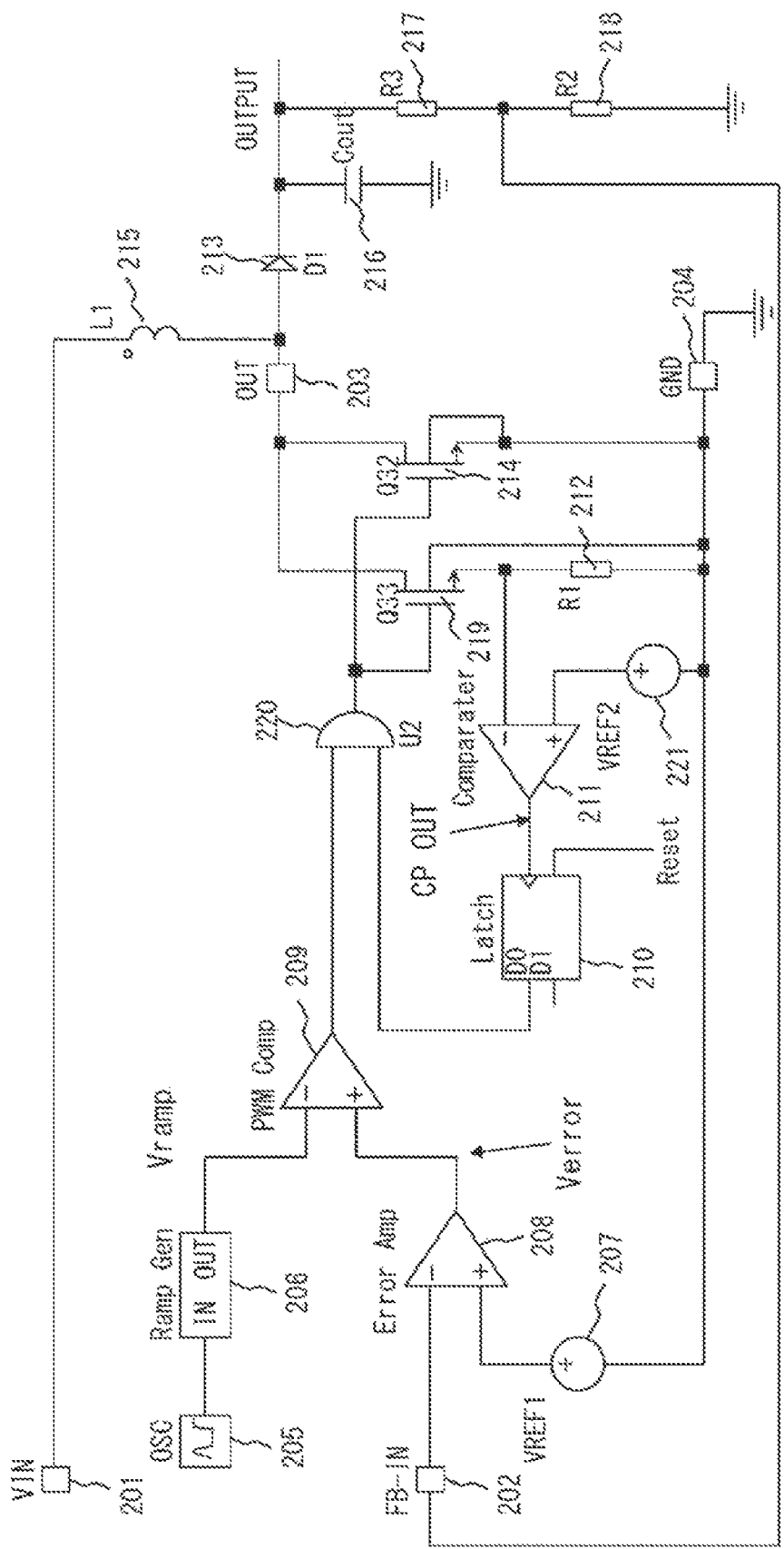
FIG. 2 shows a configuration of the boost type DC-DC converter including the conventional overcurrent preventive circuit.

As clearly indicated by the description above, the abnormal current preventive circuit according to an embodiment of the present invention directly compares the respective currents in the serial circuit of the Nch MOSFET Q4 (34) and the Pch MOSFET Q6 (36). Since the drain voltage Vi 1 (41) of the Nch MOSFET Q4 (34) and the Pch MOSFET Q6 (36) depends on the comparison result, a larger output current value can be set than by the abnormal current preventive circuit of the conventional configuration shown in FIGS. 1 and 2 in which the comparison is made in voltage. Accordingly, no delay occurs in determining the presence/absence of an abnormal current, the operation speed is very high, and a change width is outstandingly large. Therefore, as described above, an abnormal current can be quickly avoided and the operation efficiency can be improved, and the fluctuation in output voltage can be reduced with a stable operation.

Figure 6:
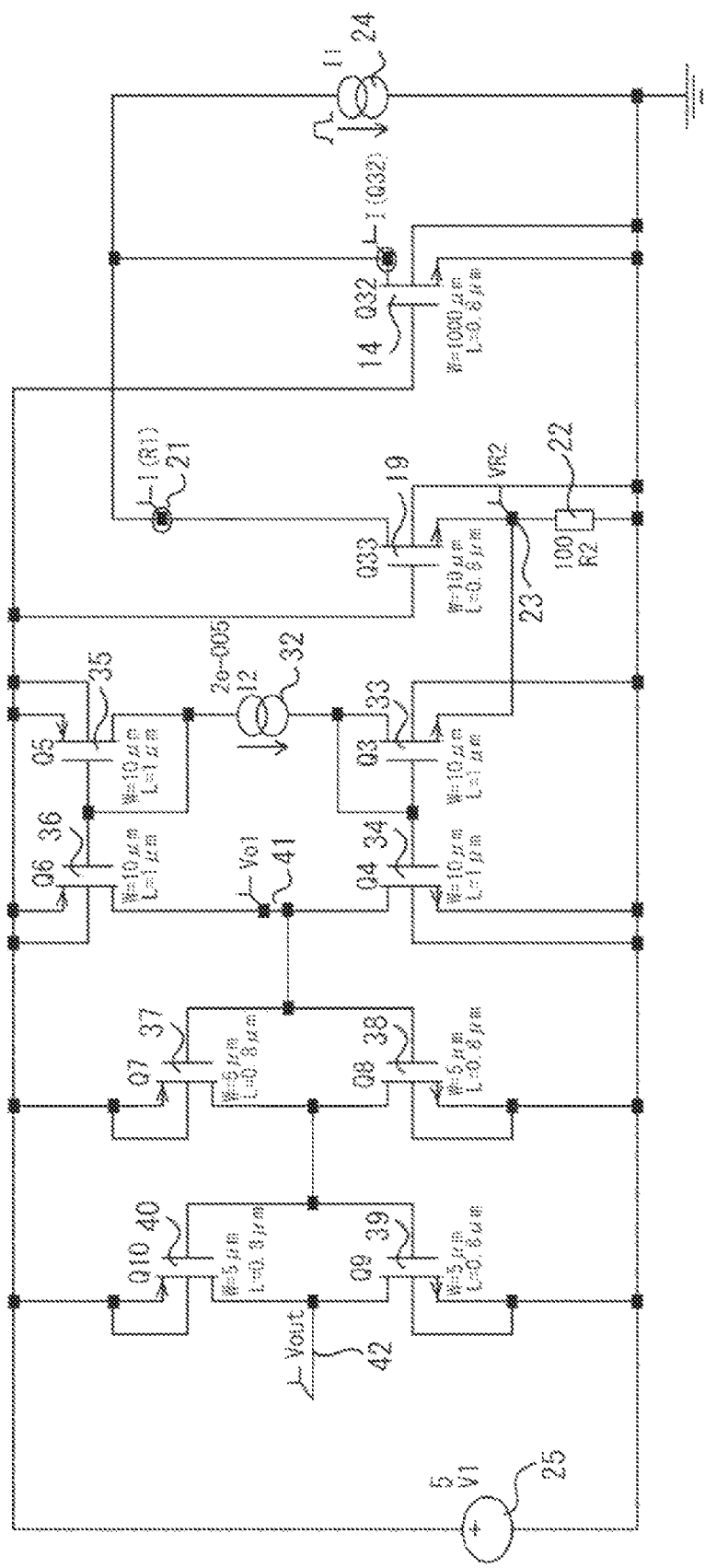
FIG. 6 shows an example of the configuration of the simulation circuit for realizing the countercurrent preventive function according to the present invention.
Figure 7A:
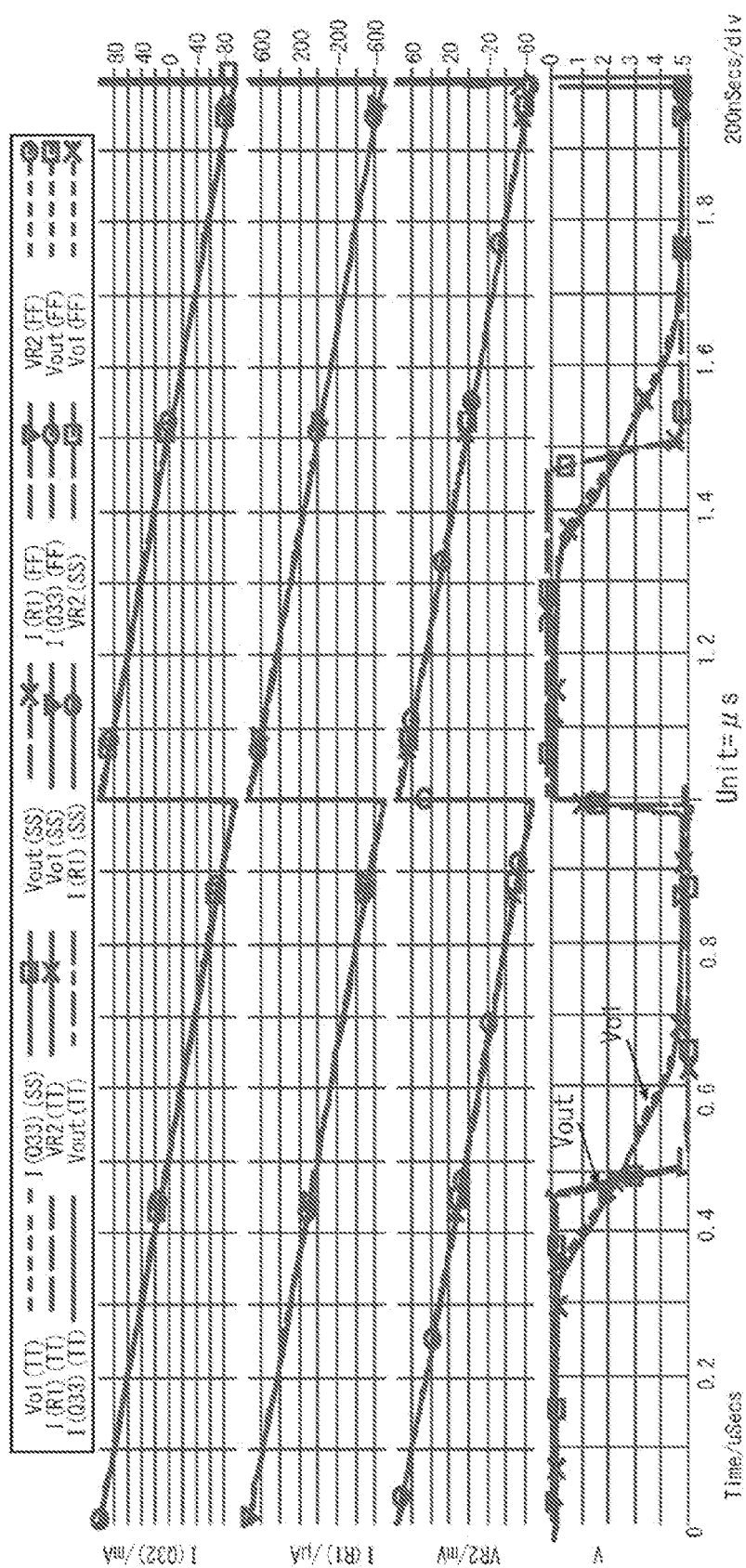
FIG. 7A is a chart (1) illustrating the change in drain voltage and output voltage when there is a variance in MOS Vth and constant current source 12 in FIG. 6.
Figure 7B:
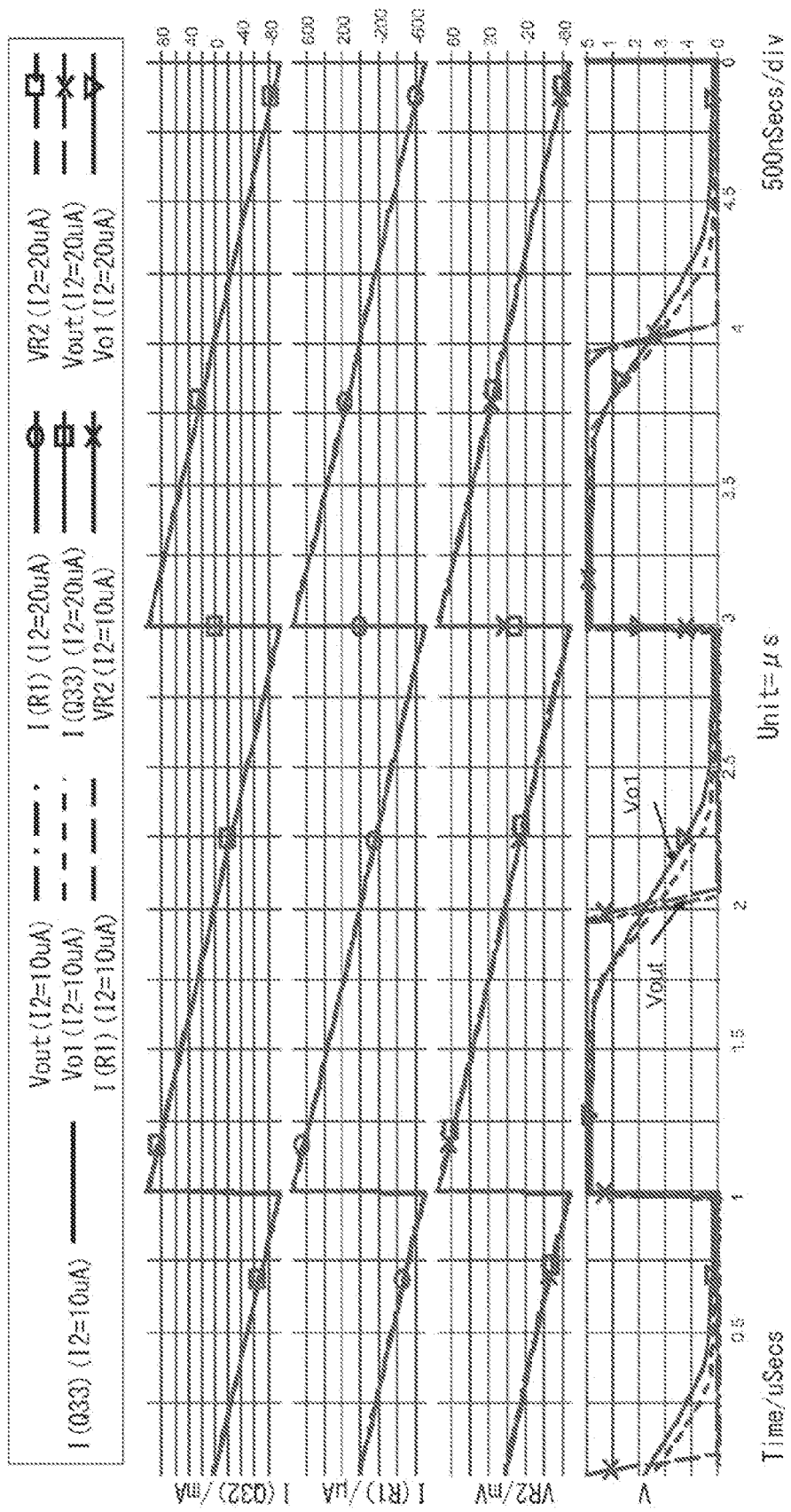
FIG. 7B is a chart (2) illustrating the change in drain voltage and output voltage when there is a variance in MOS Vth and constant current source 12 in FIG. 6.

To clarify the characteristics of the abnormal current preventive circuit according to an embodiment of the present invention, the simulation circuit is designed to realize a countercurrent preventive function as shown in FIG. 6. In the simulation circuit shown in FIG. 6, the change of the drain voltage Vo 1 (41) and the output voltage Vout (42) is displayed with respect to the variance of the MOS Vth and the current variance of the constant current source I2 (32) by changing various parameters (TT/SS/FF) as shown in FIGS. 7A and 7B. The chart of the waveform shown in FIGS. 7A and 7B is prepared by plotting, in order from the top, the current value (Q32) 14 of the switching device Q32, the current value I (R1) 21, the voltage value VR2 (23) of the point 23, the voltage value Vo 1 (41) of the Vo 1 (point 41), and the output voltage Vout (42) in the simulation circuit shown in FIG. 6.

In the simulation circuit shown in FIG. 6, the current of the I1 (24) is the current flowing through the inductor L1 (15) when the high-side switching device (Q31) 13 of the synchronous rectification buck type DC-DC converter shown in FIG. 3 is turned off and the low-side switching device (Q32) 14 is turned on. A simulation circuit to be operated when the high-side switching device (Q31) 13 is turned on and the low-side switching device (Q32) 14 is turned off is not prepared in the present specification. If the high-side switching device (Q31) 13 is turned off and the low-side switching devices (Q32) 14 and (Q33) 19 are turned on, an inductor current I (Q32) linearly decreases as shown in FIGS. 7A and 7B (since the gate width of a switching device Q32 is considerably larger than the gate width of a switching device Q33, the current flowing through the switching device Q32 is substantially equal to the current of a current source I1 (24), that is, the current flowing through the inductor L1 (15)). The direction of the arrow added to the current source I1 (24) indicates the current in the positive direction as a DC-DC converter. If a current flows in the inverse direction, an output current is a countercurrent. When a parameter (TT/SS/FF) is changed to observe MOS Vth variance and the variance of the constant current source I2 (32), the characters T, S, and F in the parameter (TT/SS/FF) are respectively short for Typical, Slow, and Fast. The double characters, that is, TT/SS/FF, indicate that both the Pch MOSFET and the Nch MOSFET in a simulation mean T=Typical, S=Slow, or F=Fast. Used as the parameter values shown in FIGS. 7A and 7B are an average value, an upper limit value, and a lower limit value in the range of the variance in a manufacture line. As shown in FIG. 7A, there is no fluctuation detected in Vo 1 and Vout when the parameter (TT/SS/FF) is changed to observe the change (variance) of Vout voltage in the drain voltage Vo 1 (41) and the output terminal (OUT) 42 with respect to the MOS Vth variance. Also as shown in FIG. 7B, there is no fluctuation in Vo 1 and Vout when the change (variance) of Vout voltage is observed in the drain voltage Vo 1 (41) and the output terminal (OUT) 42 with respect to the variance of the current value of the constant current source I2 (32).

Figure 8:
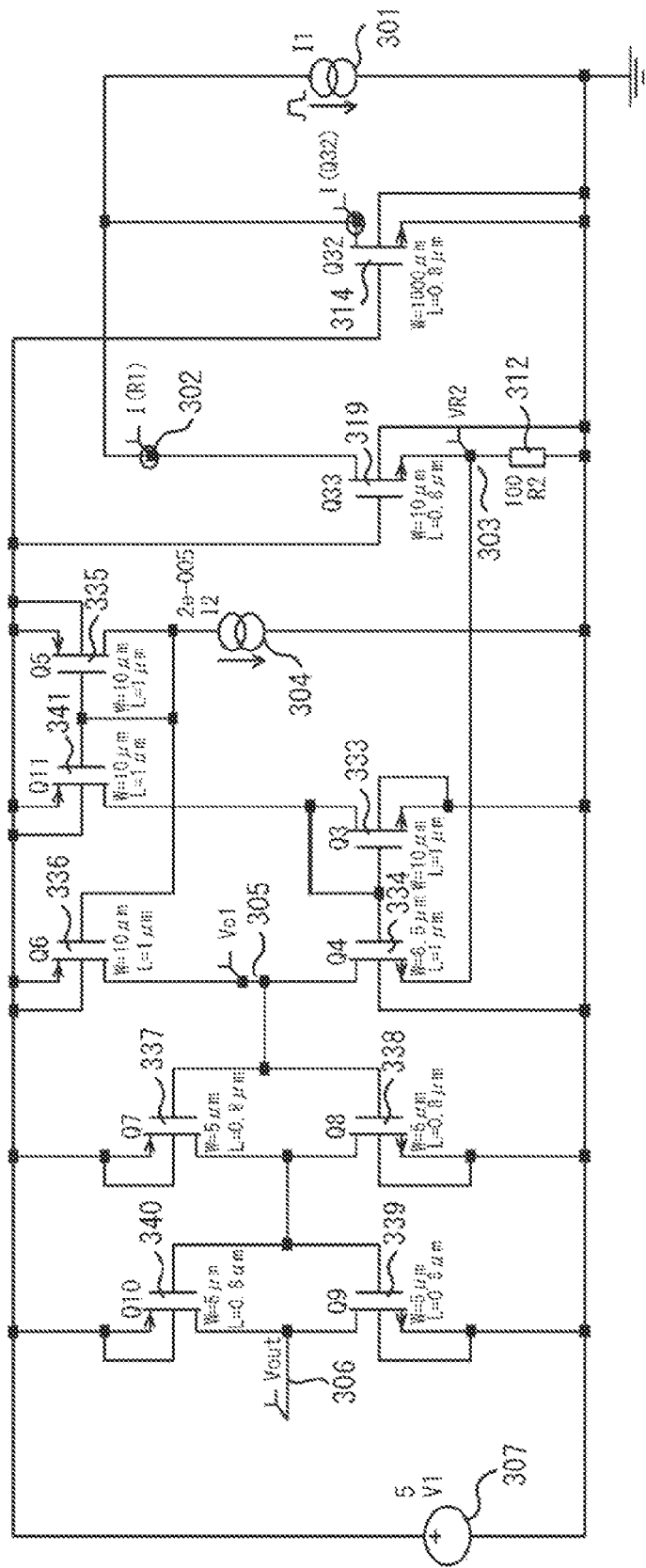
FIG. 8 shows an example of a simulation circuit for realizing a conventional countercurrent preventive function designed to be compared with the simulation circuit for realizing the countercurrent preventive function according to the present invention shown in FIG. 6.
Figure 9A:
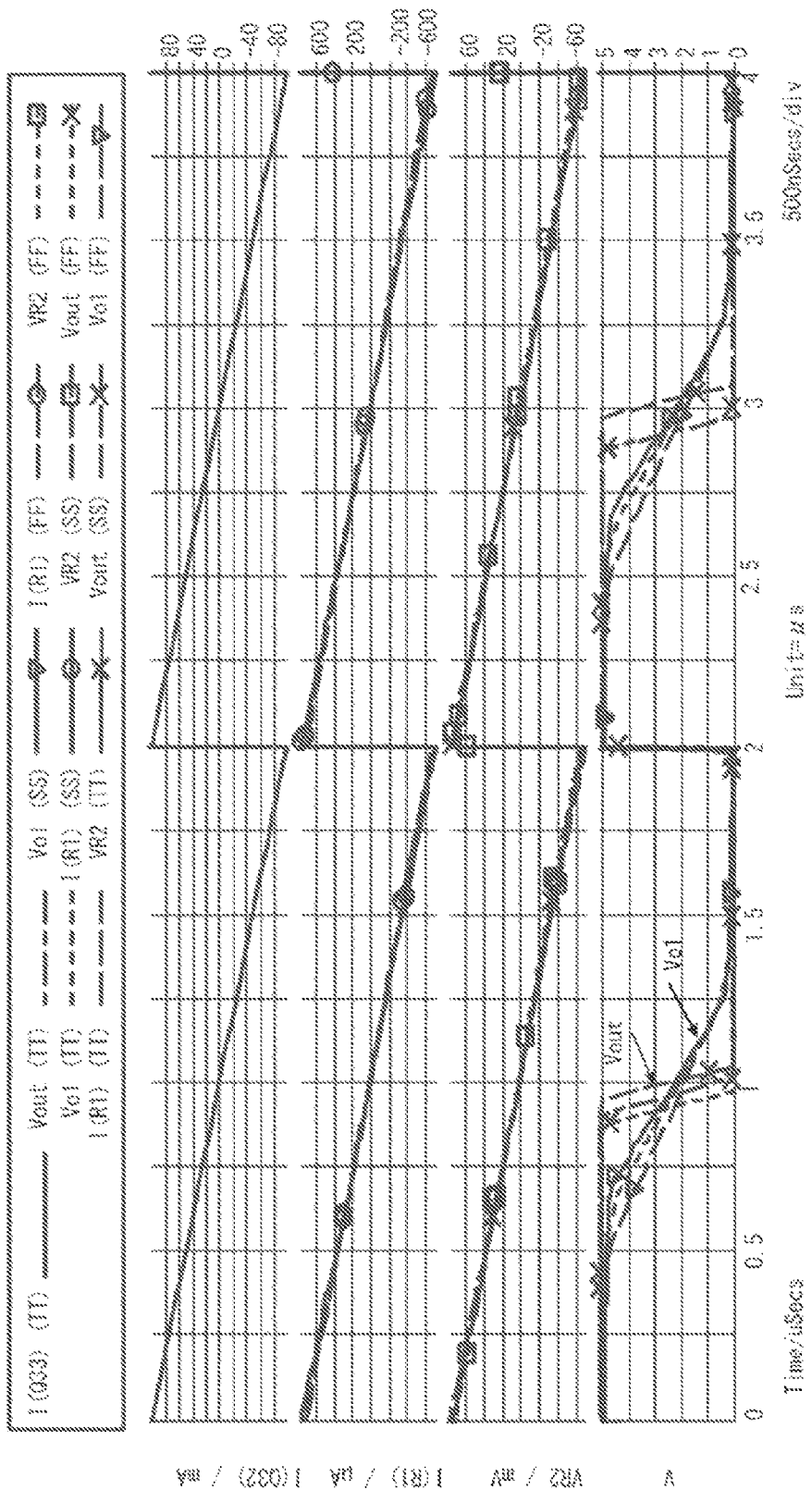
FIG. 9A is a chart (1) illustrating the change in drain voltage and output voltage when there is a variance in MOS Vth and constant current source 12 in FIG. 8.
Figure 9B:
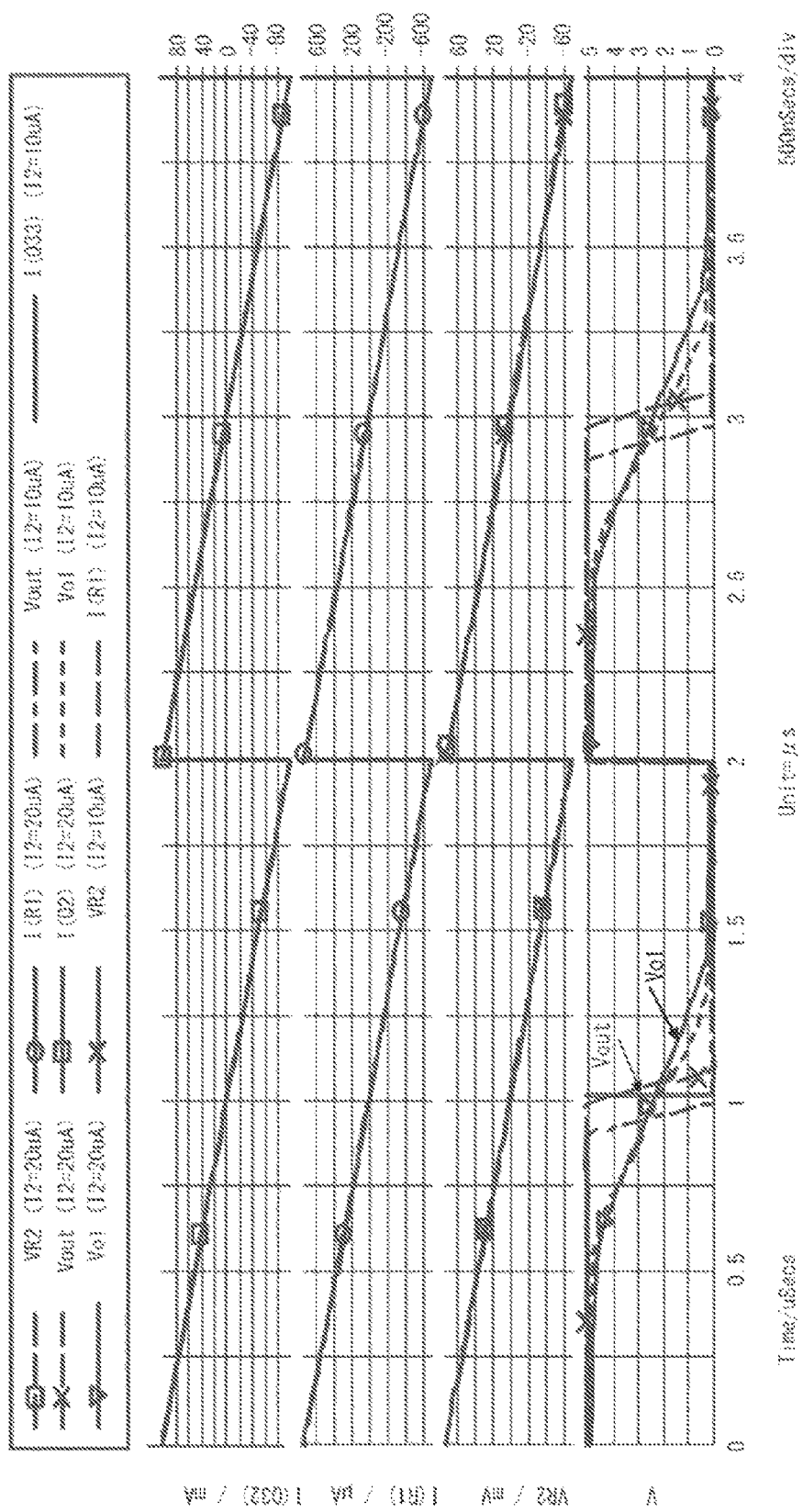
FIG. 9B is a chart (2) illustrating the change in drain voltage and output voltage when there is a variance in MOS Vth and constant current source 12 in FIG. 8.

FIG. 8 shows the comparison of an example of the design of the simulation circuit for realizing the countercurrent preventive function with the simulation circuit for realizing the countercurrent preventive function of the present invention shown in FIG. 6 to clarify the characteristics of the abnormal current preventive circuit in the circuit proposed by the patent document 1. FIGS. 9A and 9B show the changes in drain voltage and output voltage when a variance is made in the MOS Vth and the constant current source I2 in FIG. 8. They are also shown for comparison with FIGS. 7A and 7B showing the changes in drain voltage and output voltage when a variance is made in the MOS Vth and constant current source I2 in the simulation circuit for realizing the countercurrent preventive function according to the present invention shown in FIG. 6. That is, in the configuration shown in FIG. 8, various parameters (TT/SS/FF) are changed to show the changes of the current of a drain voltage Vo 1 (305) and an output voltage Vout (306) with respect to the MOS Vth variance and the variance of the current of a constant current source I2 (304) (current on which the reference current of the current comparator depends). The waveforms plotted in FIGS. 9A and 9B are, in order from the top, a current value I (Q32) 314 of the switching device Q32 of the simulation circuit shown in FIG. 8, a current value I (R1) 302 at the point 302, a voltage value VR2 (303) at the point 303, a voltage value Vo 1 (305) of Vo 1 (point 305), and the output voltage Vout (306). When the MOS Vth variance and the constant current source I2 (32) are observed by changing the parameter (TT/SS/FF), the characters T, S, and F in the parameter (TT/SS/FF) are respectively short for Typical, Slow, and Fast. The double characters, that is, TT/SS/FF, indicate that both the Pch MOSFET and the Nch MOSFET in a simulation mean T=Typical, S=Slow, or F=Fast.

As shown in FIG. 9A, there is a considerable fluctuation detected in Vo 1 and Vout as compared with FIG. 7A when the parameter (TT/SS/FF) is changed to observe the change (variance) of Vout voltage in the drain voltage Vo 1 (305) and the output terminal (OUT) 306 with respect to the MOS Vth variance. Also as shown in FIG. 9B, there is a considerable fluctuation in Vo 1 and Vout as compared with FIG. 7B when the change (variance) of Vout voltage is observed in the drain voltage Vo 1 (305) and the output terminal (OUT) 306 with respect to the variance of the current value of the constant current source I2 (304).

Figure 10:
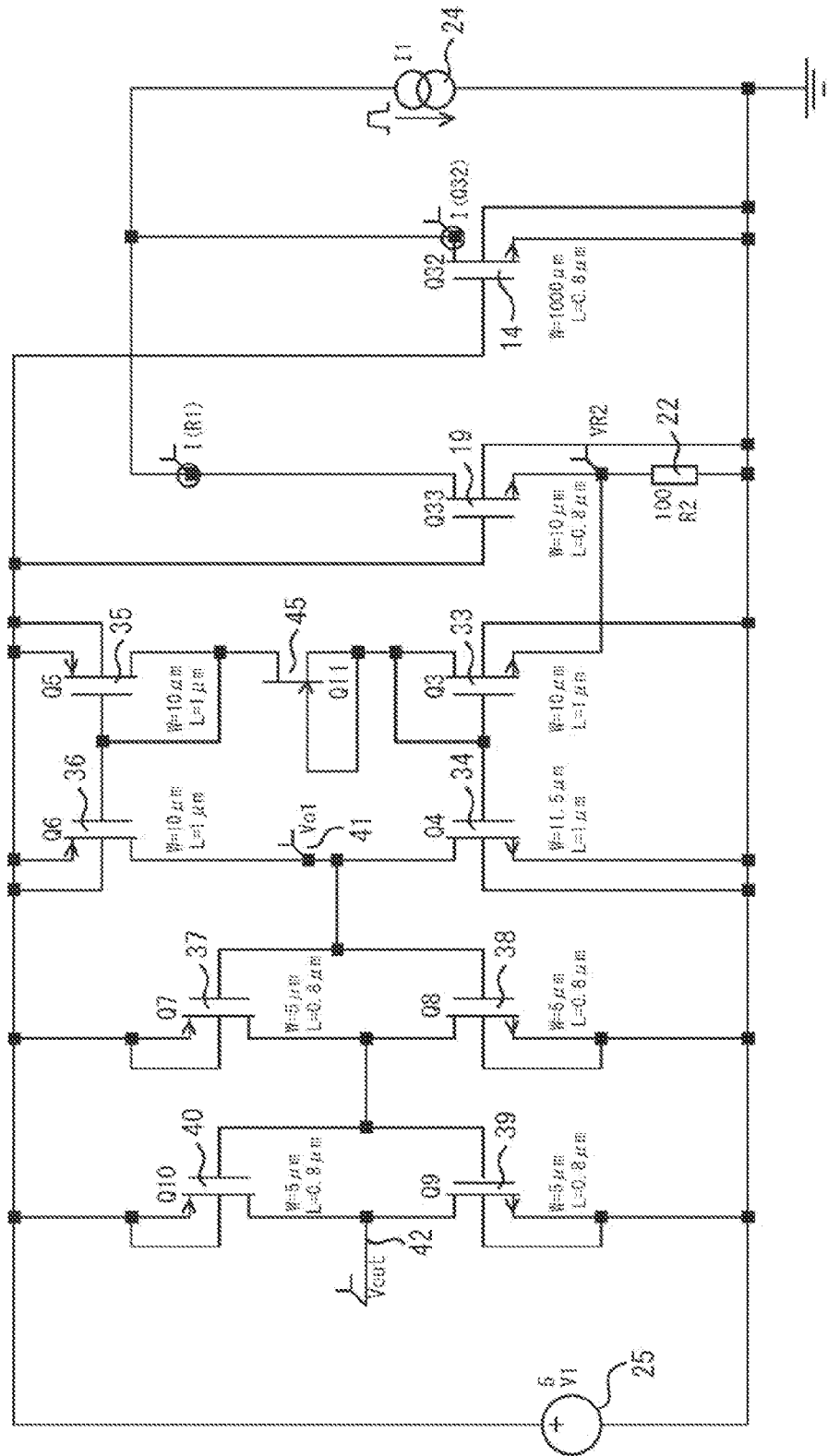
FIG. 10 shows an example of a configuration of the floating constant current source configured using a junction FET.
Figure 11:
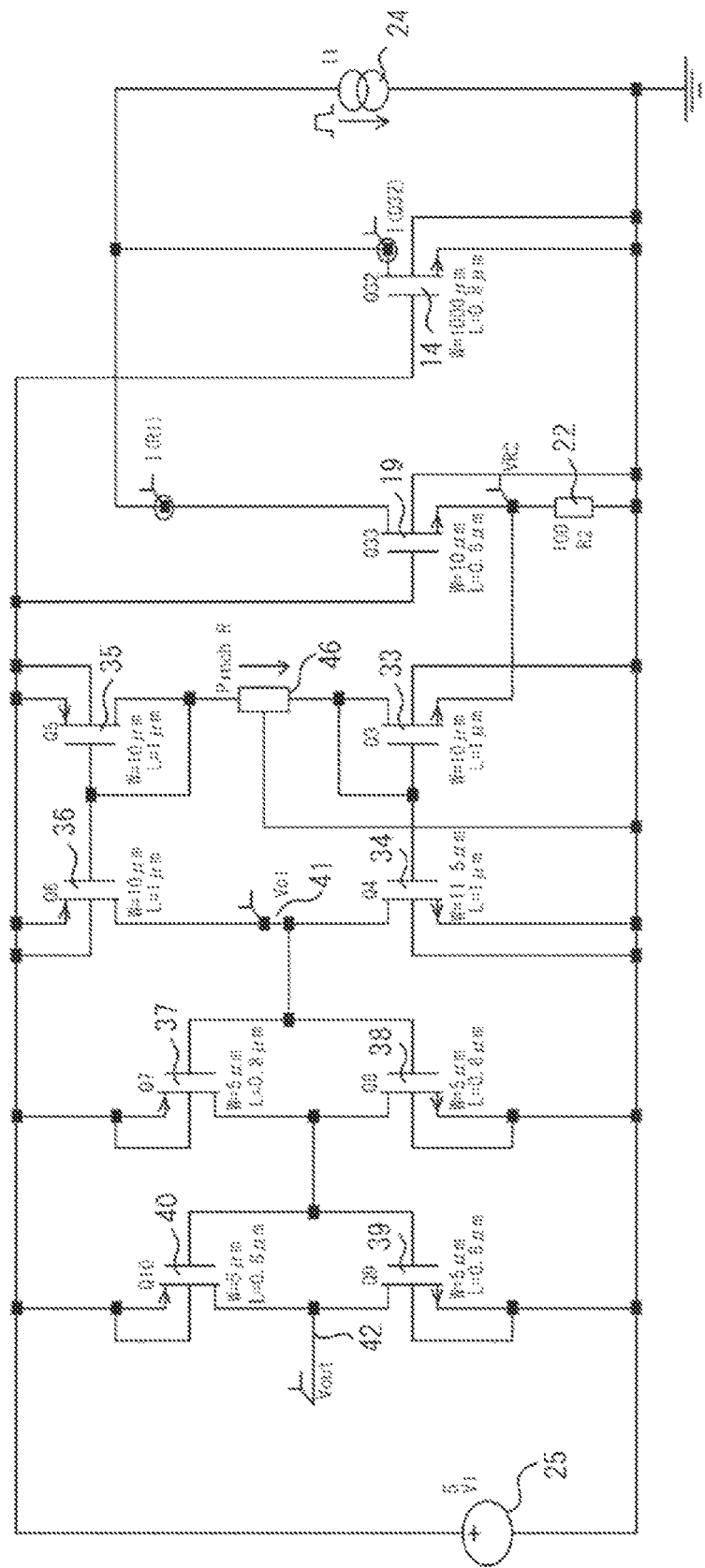
FIG. 11 shows an example of a configuration of the floating constant current source configured using a pinch resistor.
Figure 12:
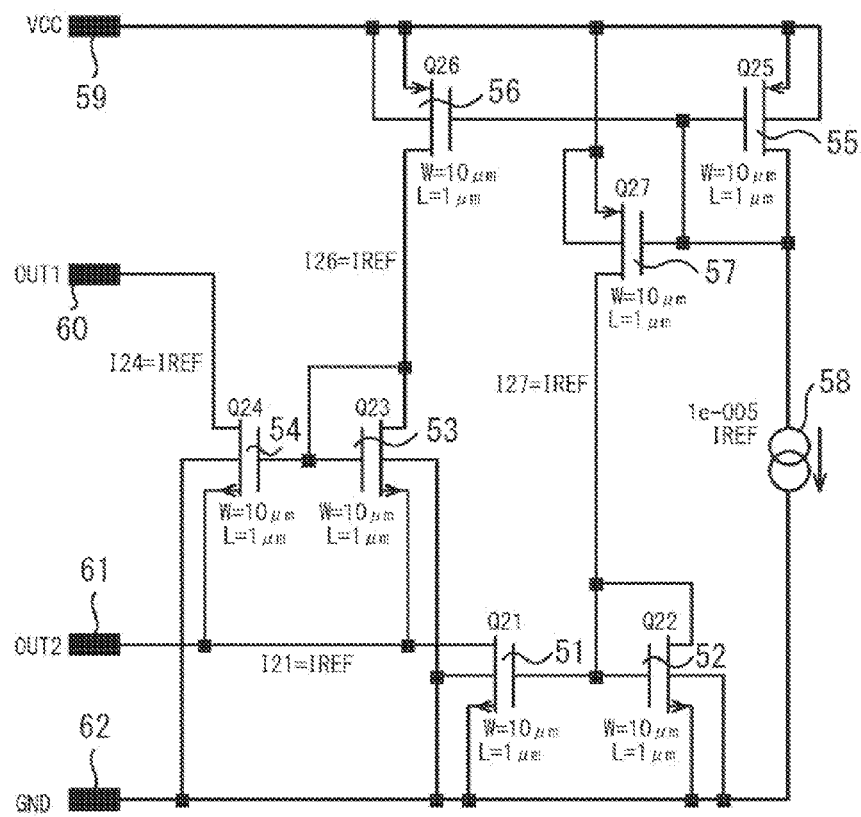
FIG. 12 shows an example of a configuration of the floating constant current source configured using only a normal MOS-FET.

FIGS. 10 through 13 show examples of the configuration of a constant current source for supplying a reference current used in the current comparator of the present invention shown in FIGS. 4 and 6. FIGS. 10 through 12 show examples of the case where the constant current source is configured using a floating constant current source on the basis of the knowledge that the principle of realizing a floating constant current source using a FET indicates a current flowing in the FET as a constant current depending on the source-gate voltage (VGS) when the source-drain voltage of the FET becomes large to a certain extent. FIG. 10 shows a configuration of the floating constant current source configured using a junction FET. FIG. 11 shows a configuration of the floating constant current source configured using a pinch resistor. FIG. 12 shows a configuration of the floating constant current source configured using only a normal MOSFET. The term 'floating constant current source' means a device for maintaining a constant current with both terminals placed in a floating state (variable without fixing potential) to discriminate the source from a normal constant current source whose one terminal is connected to a power source and a GND in the present specification.

FIG. 10 shows an example of a configuration of the floating constant current source of the present invention configured using a junction FET, but the junction FET can be replaced by a depression MOSFET. In FIG. 10, the source and the gate of a junction FET Q11 (45) is connected to the drain of the Nch MOSFET Q3 (33), the drain of the junction FET Q11 (45) is connected to the drain of the Pch MOSFET Q5 (35) (the same connections are made when the junction FET is replaced with the depression MOSFET). In FIG. 10, other circuit configurations except the junction FET Q11 (45) (or depression MOSFET) are the same as the configurations of the simulation circuit for realizing a countercurrent preventive function shown in FIG. 6, and the descriptions are omitted here.

FIG. 11 shows an example of a configuration of the floating constant current source of the present invention configured using a pinch resistor. In FIG. 11, one terminal of a pinch resistor (R) 46 is connected to the drain of the Nch MOSFET Q3 (33), and the other terminal of the pinch resistor (R) 46 is connected to the drain of the Pch MOSFET Q5 (35). In FIG. 11, other circuit configurations except the pinch resistor (R) 46 are the same as the configurations of the simulation circuit for realizing a countercurrent preventive function shown in FIG. 6, and the descriptions are omitted here.

FIGS. 10 and 11, the current flowing from the Nch MOSFET Q3 (33) to a resistor R2 (22) for current detection is a current depending on the junction FET (depression MOSFET) Q11 (45) or the pinch resistor (R) 46, and the Nch MOSFET Q4 (34) for determination of a output voltage Vo 1 (41) as a current comparator and the drain current Ids of the Pch MOSFET Q6 (36) are determined on the basis of the same current source. Therefore, it is not subject to the influence of the device variance of a current source. This is described later in detail.

FIG. 12 shows an example of a configuration of the floating constant current source of the present invention configured by a normal MOSFET only. The floating constant current source configured by a normal MOSFET only as shown in FIG. 12 has a complicated circuit configuration as compared with the floating constant current source shown in FIGS. 10 and 11. In FIG. 12, a normal constant current source (IREF) 58 is connected between the drain of a Pch MOSFET Q25 (55) and a GND terminal 62. The constant current I24 (=IREF) is sucked in the drain of an Nch MOSFET Q24 (54) through an output terminal (OUT1) 60 by the mirroring of each current mirror circuit shown in FIG. 12, and disgorged to an output terminal (OUT2) 61. The output terminal (OUT1) 60 is connected to the drain of the Pch MOSFET Q5 (35) shown in FIG. 6, and the output terminal (OUT2) 61 is connected to the drain of the Nch MOSFET Q3 (33) shown in FIG. 6. Thus, a floating constant current source can also be realized by using the constant current source (IREF) 58 and a normal MOSFET only.

Figure 13:
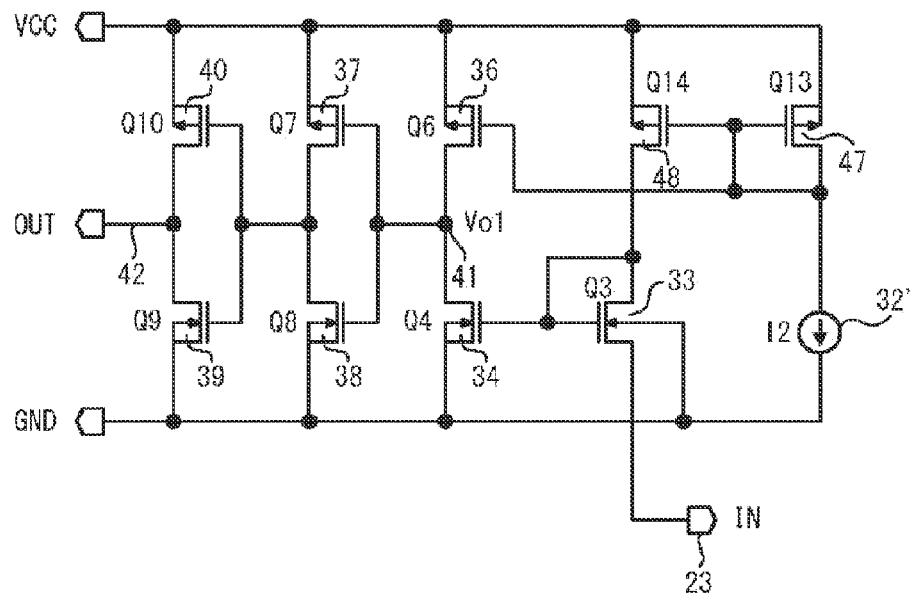
FIG. 13 shows an example of a configuration of a constant current source for providing a reference current used in the current comparator according to the present invention without a floating constant current source.

FIG. 13 shows an example of a configuration of a constant current source for supply of a reference current used in the current comparator of the present invention shown in FIGS. 4 and 6. In this example, a constant current source is configured without using a floating constant current source. In the constant current source shown in FIG. 13, a current mirror is configured by a Pch MOSFET Q13 (47) and a Pch MOSFET Q14 (48), and a normal constant current source (I2) 32' is connected between the drain of the Pch MOSFET Q13 (47) configuring the current mirror and the GND. In addition, another current mirror is configured by the Pch MOSFET Q13 (47) and the Pch MOSFET Q6 (36). A further current mirror is configured by the Nch MOSFET Q3 (33) and the Nch MOSFET Q4 (34), and an input terminal IN (23) is connected to the source of the Nch MOSFET Q3 (33) configuring the current mirror. Since the current equal to the current flowing through the normal constant current source (I2) 32' flows through the Pch MOSFET Q6 (36) and the Nch MOSFET Q3 (33), the current of the current comparator is compared at the connection point between the drain of the Pch MOSFET Q6 (36) and the drain of the Nch MOSFET Q4 (34) (the potential at the connection point depends on the comparison between the drain current of the Pch MOSFET Q6 (36) and the drain current of the Nch MOSFET Q4 (34)). Then, the drain voltage obtained at the Vo 1 (41) is led to the output terminal (OUT) 42 through the 2-stage inverter configured by the first inverter configured by the Pch MOSFET Q7 (37) and the Nch MOSFET Q8 (38), and the second inverter configured by the Pch MOSFET Q10 (40) and the Nch MOSFET Q9 (39).

On the basis of the descriptions above, an analytic study is performed on the fluctuation of the output current (Iout) flowing through the drain of the Nch MOSFET Q4 with respect to the variance of the reference current (I2) used in the current comparator according to the present invention. The relationship between the reference current (I2) and the Iout is expressed by the following equations including the current detection resistor R2 (22). In this case, it is obtained from a common equation at the saturation of the MOSFET for obtaining the relationship among the drain-source current Ids of the MOSFET, the gate-source voltage Vgs, and the threshold voltage Vth. "β" indicates a mutual conductance coefficient of the Nch MOSFET Q3 (33) and the Nch MOSFET Q4 (34) (Ids=(β/2)*(Vgs−Vth)² → Vgs=√(Ids*2/β)+Vth). For simplicity, it is assumed that the current flowing through the Nch MOSFET Q33 (19) is zero.

In the case of the simulation according to the present embodiment shown in FIG. 6:

$$Vgs(Q3)+I2*R2=Vgs(Q4) \quad (2)$$

$$\sqrt{(I2*2/\beta)}+Vth+I2*R2=\sqrt{(Iout*2/\beta)}+Vth \quad (3)$$

$$\sqrt{(Ids*2/\beta)}+I2*R2=\sqrt{(Iout*2/\beta)} \quad (4)$$

where Iout indicates the Ids of the Q4.

In the case of the simulation circuit according to the patent document 1 shown in FIG. 8:

$$Vgs(Q3)=Vgs(Q4)+Iout*R2 \quad (5)$$

$$\sqrt{(I2*2/\beta)}+Vth=\sqrt{(Iout*2/\beta)}+Vth+Iout*R2 \quad (6)$$

$$\sqrt{(I2*2/\beta)}=\sqrt{(Iout*2/\beta)}+Iout*R2 \quad (7)$$

From the relational expression between the I2 of each simulation circuit and Iout, the simulation circuit according to the present embodiment has the term of I2*R2 while the simulation circuit according to the patent document 1 shown in FIG. 8 has the term of Iout*R2. Accordingly, in the case of the simulation circuit according to the present embodiment, a change of the I2 is expressed as a change of the Iout as is while in the simulation circuit according to the patent document 1 shown in FIG. 8, a negative feedback for Iout*R2 is applied, thereby reducing the influence of the change of the Iout.

In each simulation circuit, since the value of the output voltage Vo 1 (41) is determined by the comparison between the current (Ids) of the Pch MOSFET Q6 and the current (Ids) of the Nch MOSFET Q4 as the Tout of the current detection circuit, the current of the Pch MOSFET Q6 fluctuates by the variance of the I2 if the current value of the I2 (IREF) varies. Therefore, the Vo 1 and Vout (detection level) are to be unchanged if the current (Ids) of the Nch MOSFET Q4 fluctuates by the equal amount.

In the simulation circuit according to the present embodiment, the current (Ids) of the Nch MOSFET Q4 fluctuates by the substantially equal amount of the variance of the I2 as expressed by the equation (4) above. However, in the simulation circuit according to the patent document 1 shown in FIG. 8, the fluctuation width of the current (Ids) of the Nch MOSFET Q4 is reduced by the amount of Iout*R2 as expressed by the equation (7) above, thereby causing the fluctuation of the detection level.

The result is reflected by the waveforms shown in FIGS. 7A and 7B and 9A and 9B, and the simulation circuit according to the present embodiment is stable against the device variance as compared with the simulation circuit according to the patent document 1.

Figure 14:
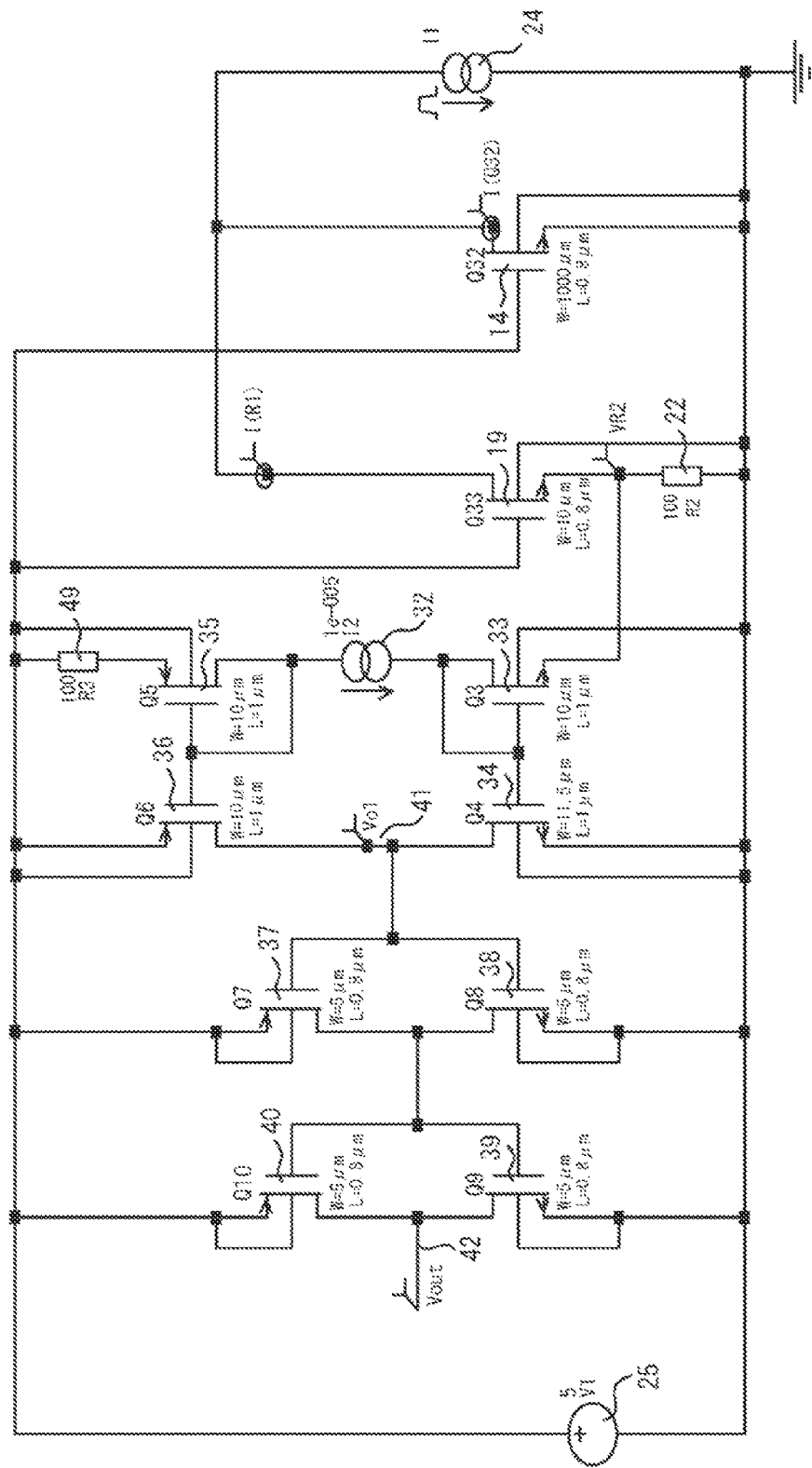
FIG. 14 shows another example of the configuration of the simulation circuit for realizing the countercurrent preventive function according to the present invention.

The simulation circuit according to the present embodiment also has the element of a slight fluctuation for the I2*R2 expressed by the equation (4) above. FIG. 14 shows another example of the configuration of the simulation circuit for realizing the countercurrent preventive function according to the present invention. As shown in FIG. 14, a resistor R3 (49) having an equal resistance value as the current detection resistor R2 (22) is also inserted into the Pch MOSFET Q5 (35) to completely correct the fluctuation described above. However, there practically occurs no problem without the resistor R3 (49). The configuration of the circuit shown in FIG. 14 is the same as what is shown in FIG. 6 except the additional configuration of the above-mentioned resistor R3 (49), and the explanation is omitted here. The values are shown for W and L in each simulation circuit, but they are only examples for a simulation, and are not limited to the values.

Embodiment 2

Figure 15:
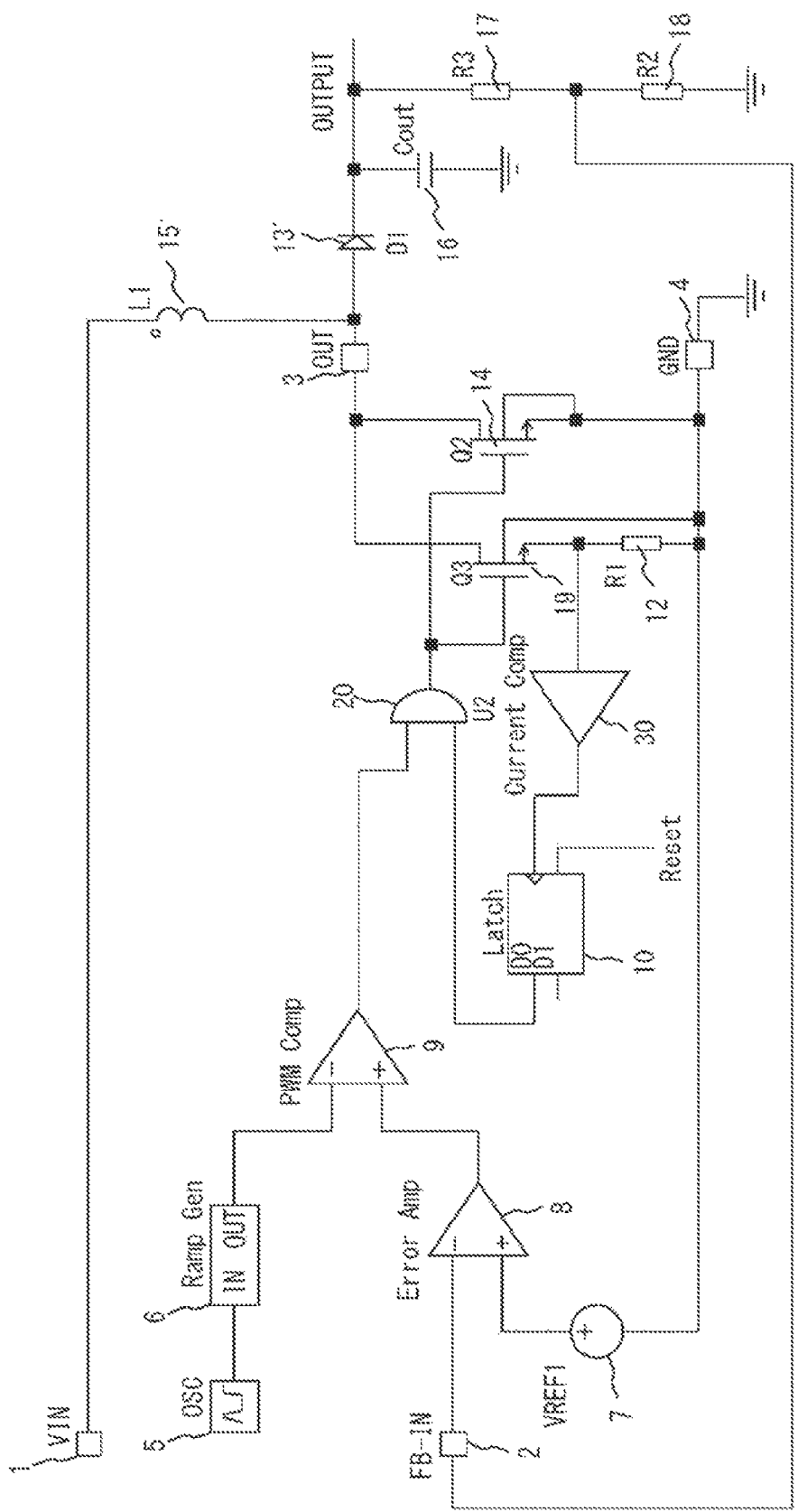
FIG. 15 shows a configuration of the abnormal current (overcurrent) preventive circuit and the boost type DC-DC converter including the circuit according to an embodiment of the present invention.

The description above is prepared for the embodiment of the countercurrent preventive circuit in a buck type DC-DC converter, but a current comparator similar to the circuit described above for the embodiment can be applied to the overcurrent preventive circuit of the boost type DC-DC converter shown in FIG. 15. That is, FIG. 15 shows an example of the embodiment of the overcurrent preventive circuit in a boost type DC-DC converter. In the embodiment, the voltage comparator 211 in the conventional overcurrent preventive circuit shown in FIG. 2 for determining the presence/absence of an overcurrent by comparing the voltage of the detection resistor R1 (212) with the reference voltage VREF2 (221) is replaced with the current comparator 30 for determining the presence/absence of an overcurrent by comparing the current flowing through the current detection resistor R1 (12) with a predetermined reference current. When an overcurrent is detected using the current comparator 30, the balance between the sizes of the drain current of the Pch MOSFET Q6 (36) and the drain current of the Nch MOSFET Q4 (34) so that they can be made equal to each other when the voltage value VR2 (23) of the point 23 reaches a value indicating an overcurrent in the circuit shown in FIG. 6. To be more concrete, the size (gate width/gate length) of the Nch MOSFET Q4 (34) is made to be larger than that of the Pch MOSFET Q6 (36) to allow the current to easily flow. With the configuration, at the transition from a non-overcurrent state to an overcurrent state, the output from the current comparator 30 shown in FIG. 15 can be switched.

Embodiment 3

Figure 16:
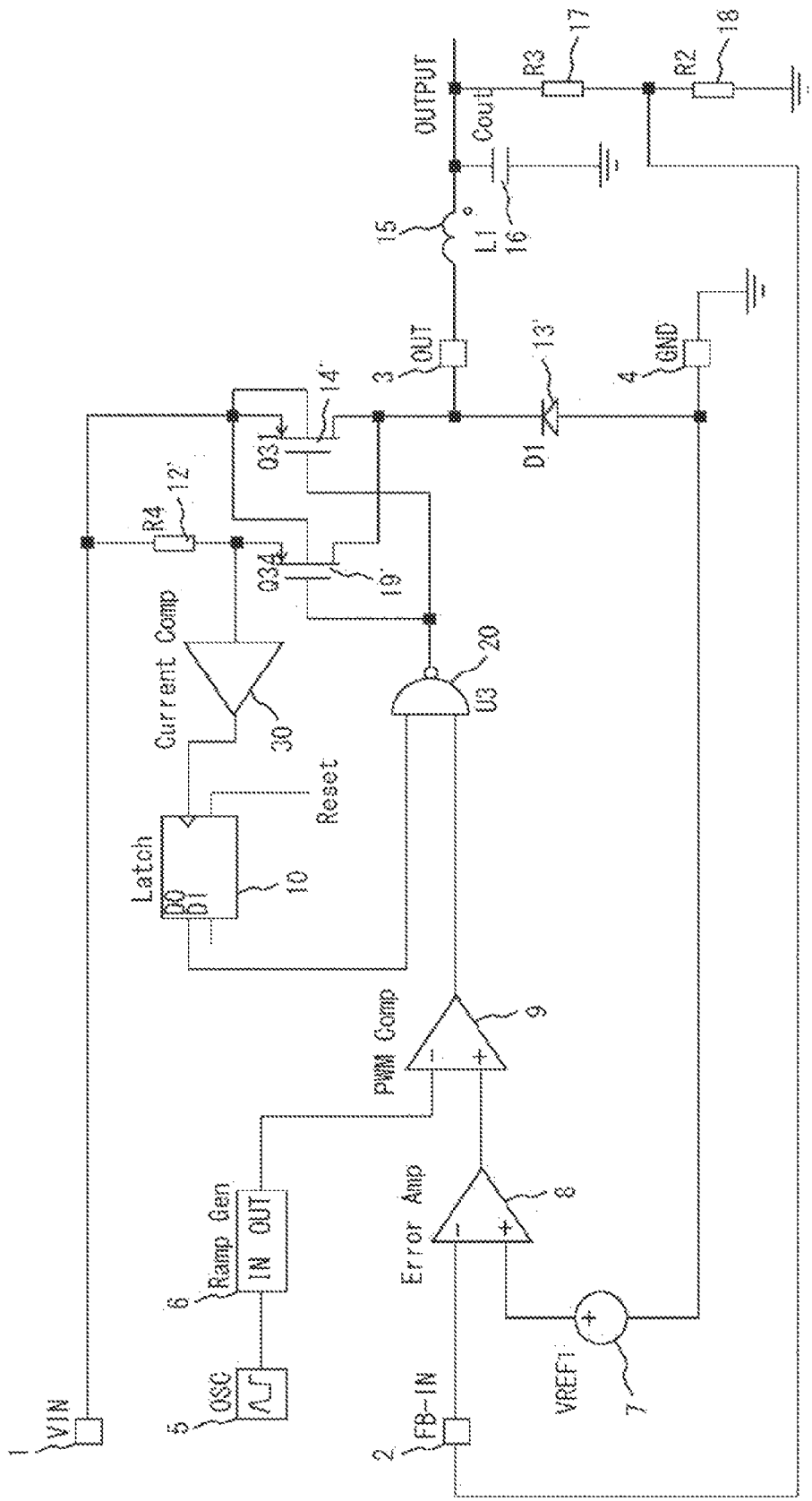
FIG. 16 shows a configuration of the abnormal current (overcurrent) preventive circuit and the buck type DC-DC converter including the circuit according to an embodiment of the present invention.

FIG. 16 shows an embodiment of the overcurrent preventive circuit in a buck type DC-DC converter. Since a high-side switching device (Q31) 14' to be checked for an overcurrent is connected to the power source 1, an abnormal current (overcurrent) detection resistor R4 (12') is also connected between the source of a switching device (Q34) 19' and the power source 1. The switching device (Q31) 14' and the switching device (Q34) 19' are configured by a Pch MOSFET unlike the switching devices Q32 and Q33 shown in FIG. 3. Therefore, the position of the input terminal of the current comparator 30 is different from that of the current comparator of the boost type DC-DC converter, and is changed to the connection point of the abnormal current (overcurrent) detection resistor R4 (12') and the source of the switching device (Q34) 19'.

Figure 17:
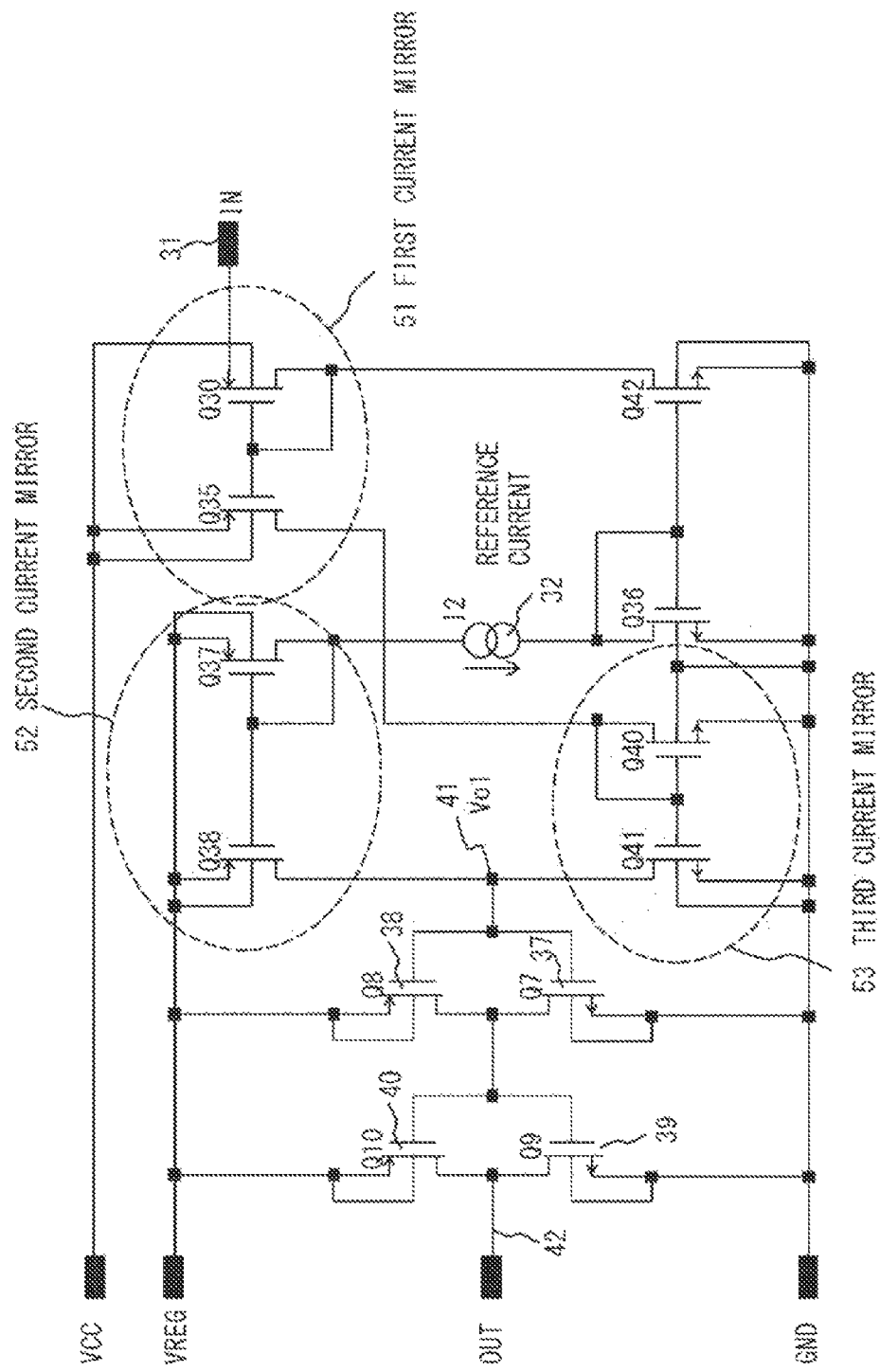
FIG. 17 shows a configuration of a current comparator used in the buck type DC-DC converter shown in FIG. 16.

FIG. 17 shows a configuration of a current comparator used in preventing an overcurrent of the buck type DC-DC converter. In FIG. 17, the configuration is performed using two types of power source terminals of the VCC (same as the input power source terminal (VIN terminal) 1) and the VREG. The current comparator shown in FIG. 17 is used when the voltage of the power source 1 of the buck type DC-DC converter shown in FIG. 16 is normally 6V or more. When the power source voltage of the buck type DC-DC converter shown in FIG. 16 is 6V or more, the basic control circuits from the oscillator (OSC) 5 to the PWM comp 9 or other DC-DC converters have the output VREG of a regulator (not shown in the attached drawings) of 5V output as a power source in many cases. Therefore, as shown in FIG. 17, only a Pch MOSFET Q30 and a Pch MOSFET Q35 as current detection units of a current comparator use the VCC terminal of 6V or more as the power source, and other circuits use the VREG of 5V as the power source. With the configuration, the output current of a first current mirror 51 configured by the Pch MOSFET Q30 and the Pch MOSFET Q35 is mirrored by a third current mirror 53 configured by an Nch MOSFET Q40 and an Nch MOSFET Q41, and a reference current 32 is also mirrored by a second current mirror 52 configured by a Pch MOSFET Q37 and a Pch MOSFET Q38 so that the currents are compared by the current flowing to the drains of the Pch MOSFET Q38 and the Nch MOSFET Q41. Since the basic operations are similar to those shown in FIG. 4 except that the Pch MOSFET and the Nch MOSFET are exchanged and that the number of current mirrors is increased because there are two power sources, detailed descriptions are omitted here. As described above with reference to the embodiment 2, the drain current of the Pch MOSFET Q38 and the drain current of the Nch MOSFET Q41 are to be unbalanced so that they can be made equal to each other when the voltage value of the input terminal IN 31 of the current comparator 30 reaches a value indicating an overcurrent.

Figure 18:
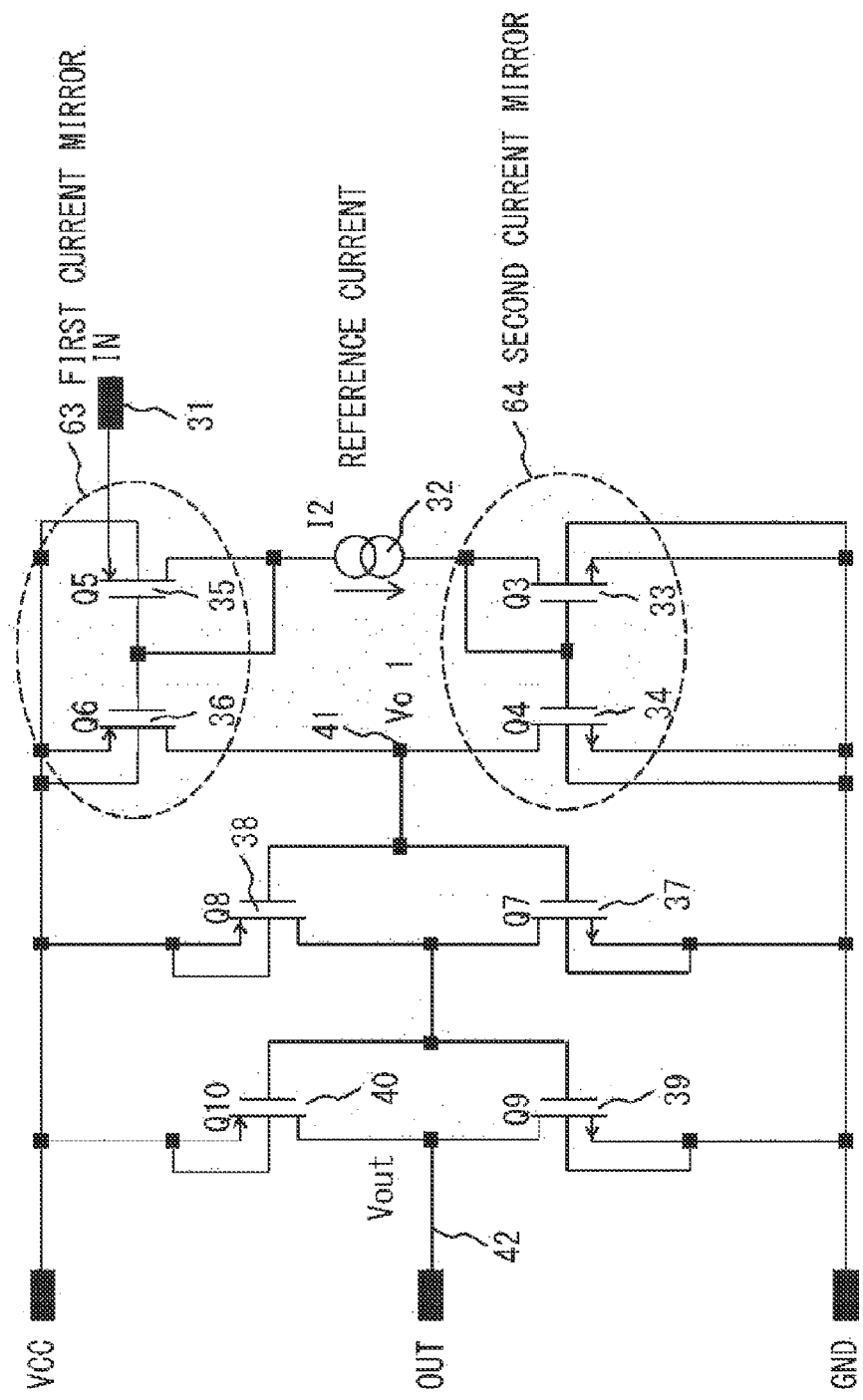
FIG. 18 shows a configuration of another current comparator used in the buck type DC-DC converter shown in FIG. 16.

FIG. 18 shows a configuration of another current comparator used in a buck type DC-DC converter. In FIG. 18, unlike FIG. 17, the configuration is made using a power source terminal of only the VCC, the second current mirror 52 and the third current mirror 53 shown in FIG. 17 are replaced with a first current mirror 63 and a second current mirror 64 in FIG. 18, and other components are the same as those in FIG. 17.

What is claimed is:
1. An apparatus comprising:
   an abnormal current preventive circuit in a synchronous rectification buck type DC-DC converter for providing a first Nch MOSFET at a low side, connecting a second Nch MOSFET similar to the first Nch MOSFET in parallel to the first Nch MOSFET to detect an abnormal current of the first Nch MOSFET, connecting a detection resistor between a source of the second Nch MOSFET and a ground, inputting a voltage across the detection resistor to a current comparator, and determining by the current comparator an abnormal current by converting the input voltage into a current, and comparing the current with a reference current, thereby determining the abnormal current, wherein
   the current comparator comprises a first current mirror configured by a first diode connected Nch MOSFET and to which a source is connected to an input terminal and a second Nch MOSFET whose gate is connected to a gate of the first Nch MOSFET; a second current minor configured by a first diode-connected Pch MOSFET and a second Pch MOSFET whose gate is connected to the gate of the first Pch MOSFET; and a current source composed of a floating constant current source for supplying an equal reference current to a drain of the first Nch MOSFET of the first current minor and a drain of the first Pch MOSFET of the second current mirror;
   a drain of the second Nch MOSFET of the first current mirror is connected to a drain of the second Pch MOSFET of the second current minor, at least one or more inverter is connected to a connection point, output of the inverter is connected to an output terminal of the current comparator, and output of the current comparator is determined by a comparison result between an output current of the second current mirror and an output current of the first current mirror depending on a voltage of the input terminal.

2. The apparatus according to claim 1, wherein the floating constant current source is configured by a junction FET, a depression MOSFET, or a pinch resistor.

3. An apparatus comprising:
   an abnormal current preventive circuit in a boost type DC-DC converter for connecting a first Nch MOSFET as a first switching device in parallel to a second Nch MOSFET similar to the first Nch MOSFET, connecting a detection resistor between a source of the second Nch MOSFET and a ground, inputting a voltage across the detection resistor to a current comparator, converting the input voltage into a current by the current comparator, comparing the current with a reference current, determining presence/absence of an abnormal current, and turning off the first and second Nch MOSFETs when an abnormal current is detected, wherein the current comparator comprises a first current mirror configured by a first diode-connected Nch MOSFET and to which a source is connected to an input terminal and a second Nch MOSFET whose gate is connected to a gate of the first Nch MOSFET; a second current minor configured by a first diode-connected Pch MOSFET and a second Pch MOSFET whose gate is connected to the gate of the first Pch MOSFET; and a current source composed of a floating constant current source for supplying an equal reference current to a drain of the first Nch MOSFET of the first current mirror and a drain of the first Pch MOSFET of the second current mirror;

a drain of the second Nch MOSFET of the first current mirror is connected to a drain of the second Pch MOSFET of the second current mirror, at least one or more inverter is connected to a connection point, output of the inverter is connected to an output terminal of the current comparator, and output of the current comparator is determined by a comparison result between an output current of the second current mirror and an output current of the first current mirror depending on a voltage of the input terminal.

4. The apparatus according to claim 3, wherein the floating constant current source is configured by a junction FET, a depression MOSFET, or a pinch resistor.

5. An apparatus comprising:

an abnormal current preventive circuit in a buck type DC-DC converter for connecting a first Pch MOSFET as a first switching device in parallel to a second Pch MOSFET similar to the first Pch MOSFET, connecting a detection resistor between a source of the second Pch MOSFET and a power source, inputting a voltage across the detection resistor to a current comparator, converting the input voltage into a current by the current comparator, comparing the current with a reference current, determining presence/absence of an abnormal current, and turning off the first and second Pch MOSFETs when an abnormal current is detected, wherein the current comparator comprises a first current mirror configured by a first diode connected Pch MOSFET and to which a source is connected to an input terminal and a second Pch MOSFET whose gate is connected to a gate of the first Pch MOSFET; a second current minor configured by a first diode-connected Nch MOSFET and a second Nch MOSFET whose gate is connected to the gate of the first Nch MOSFET; and a current source composed of a floating constant current source for supplying an equal reference current to a drain of the first Pch MOSFET of the first current mirror and a drain of the first Nch MOSFET of the second current mirror;

a drain of the second Pch MOSFET of the first current minor is connected to a drain of the second Nch MOSFET of the second current mirror, at least one or more inverter is connected to a connection point, output of the inverter is connected to an output terminal of the current comparator, and output of the current comparator is determined by a comparison result between an output current of the second current mirror and an output current of the first current mirror depending on a voltage of the input terminal.

6. The apparatus according to claim 5, wherein the floating constant current source is configured by a junction FET, a depression MOSFET, or a pinch resistor.

7. An apparatus comprising:

an abnormal current preventive circuit in a buck type DC-DC converter for connecting a first Pch MOSFET as a first switching device in parallel to a second Pch MOSFET similar to the first Pch MOSFET, connecting a detection resistor between a source of the second Pch MOSFET and a power source, inputting a voltage across the detection resistor to a current comparator, converting the input voltage into a current by the current comparator, comparing the current with a reference current, determining presence/absence of an abnormal current, and turning off the first and second Pch MOSFETs when an abnormal current is detected, wherein the current comparator comprises a first current mirror configured by a first diode-connected Pch MOSFET whose source is connected to an input terminal and a second Pch MOSFET whose gate is connected to a gate of the first Pch MOSFET, wherein a source of the second Pch MOSFET is connected to a first power source terminal; a second current mirror configured by a diode-connected third Pch MOSFET whose source is connected to a second power source terminal and a fourth Pch MOSFET whose gate is connected to a gate of the third Pch MOSFET and whose source is connected to the second power source terminal; a third current mirror configured by an Nch MOSFET for mirroring an output current of the first current mirror; and a current source composed of a floating constant current source for supplying an equal reference current a drain of the first Pch MOSFET of the first current mirror and a drain of the third Pch MOSFET of the second current mirror, and an output current of the third current mirror depends on a voltage of the input terminal, an output current of the second current mirror depends on the reference current, output terminals of the third and second current mirrors are connected to compare the output currents of the third and second current mirrors, at least one or more inverter is connected to a connection point, and a comparison result of the output currents of the third and second current mirrors is output from an output of the inverter.

8. The apparatus according to claim 7, wherein the floating constant current source is configured by a junction FET, a depression MOSFET, or a pinch resistor.

* * * * *